US012672091B2

(12) United States Patent
Manolakos et al.

(10) Patent No.: US 12,672,091 B2
(45) Date of Patent: Jun. 30, 2026

(54) FACILITATING TIME-ALIGNED MEASUREMENTS FOR USER EQUIPMENTS (UES) AND BASE STATIONS FOR POSITIONING

(71) Applicant: QUALCOMM Incorporated, San Diego, CA (US)

(72) Inventors: Alexandros Manolakos, Escondido, CA (US); Mukesh Kumar, Hyderabad (IN); Sony Akkarakaran, Poway, CA (US); Guttorm Ringstad Opshaug, Redwood City, CA (US); Sven Fischer, Nuremberg (DE); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 18/253,882

(22) PCT Filed: Dec. 9, 2021

(86) PCT No.: PCT/US2021/072825
§ 371 (c)(1),
(2) Date: May 22, 2023

(87) PCT Pub. No.: WO2022/155000
PCT Pub. Date: Jul. 21, 2022

(65) Prior Publication Data
US 2023/0422202 A1 Dec. 28, 2023

(30) Foreign Application Priority Data
Jan. 17, 2021 (IN) .............................. 202141002131

(51) Int. Cl.
*H04L 1/00* (2006.01)
*H04B 17/318* (2015.01)
(Continued)

(52) U.S. Cl.
CPC .......... *H04W 64/00* (2013.01); *H04B 17/328* (2023.05); *H04L 5/0051* (2013.01)

(58) Field of Classification Search
CPC ..... H04W 64/00; H04W 24/10; H04W 24/08; H04W 56/001; H04W 72/0446;
(Continued)

(56) References Cited

U.S. PATENT DOCUMENTS

2019/0166453 A1 5/2019 Edge et al.
2020/0228381 A1 7/2020 Manolakos et al.
(Continued)

FOREIGN PATENT DOCUMENTS

CN 106304328 A 1/2017
CN 111343579 A 6/2020
(Continued)

OTHER PUBLICATIONS

International Search Report and Written Opinion—PCT/US2021/072825—ISA/EPO —Mar. 17, 2022.
(Continued)

*Primary Examiner* — Tanmay K Shah
(74) *Attorney, Agent, or Firm* — Muncy, Geissler, Olds & Lowe, P.C./QUALCOMM Incorporated

(57) ABSTRACT

Disclosed are techniques for communication. In an aspect, a location server transmits a first request to at least a first network node, the first request including at least a first set of parameters indicating one or more first time instances during which the first network node is expected to perform and report one or more first positioning measurements of periodic positioning reference signals transmitted by a second network node during a plurality of periodic time instances, the plurality of periodic time instances including the one or more first time instances, and receives a first measurement report from the first network node, the first measurement report
(Continued)

1100

Location Server

Transmit, to a first network node, a first set of parameters indicating time and frequency information related to transmission of periodic positioning reference signals by a second network node — 1110

Transmit a first request to at least the first network node, the first request including at least a second set of parameters indicating one or more first time instances of a plurality of periodic time instances during which the first network node is expected to perform and report one or more first positioning measurements — 1120

Receive a first measurement report from the first network node, the first measurement report including the one or more first positioning measurements of the periodic positioning reference signals transmitted by the second network node during the one or more first time instances — 1130 report including the one or more first positioning measurements of the periodic positioning reference signals transmitted by the second network node during the one or more first time instances.

28 Claims, 17 Drawing Sheets

(51) Int. Cl.
*H04L 5/00* (2006.01)
*H04W 64/00* (2009.01)

(58) Field of Classification Search
CPC .. H04B 17/328; H04B 17/254; H04B 17/318; H04L 5/0051; H04L 5/0048; G01S 5/0205; G01S 5/0236
USPC ....................................................... 455/456.1
See application file for complete search history.

(56) References Cited

U.S. PATENT DOCUMENTS

| | | | |
|---|---|---|---|
| 2020/0336264 | A1 | 10/2020 | Faxér et al. |
| 2020/0367193 | A1 | 11/2020 | Cha et al. |

FOREIGN PATENT DOCUMENTS

| | | | | |
|---|---|---|---|---|
| EP | 3310102 | A1 | 4/2018 | |
| EP | 3636018 | A1 | 4/2020 | |
| EP | 3902292 | A1 | 10/2021 | |
| WO | WO-2020125310 | A1 * | 6/2020 | ............. G01S 19/46 |

OTHER PUBLICATIONS

Moderator (Catt): "FL Summary #10 for Potential Positioning Enhancements", 3GPP TSG RAN WG1 Meeting #103-e, e-meeting, Oct. 26-Nov. 13, 2020, R1-2009679, 147 pages, chapter. 1,2.1, 2.5, 3.2, 3.3, 3.6, 4.1, 4.3, 5.1, 5.2, 5.9, 7.
Taiwan Search Report—TW110146436—TIPO—Aug. 8, 2025.

* cited by examiner

306

390

Network Transceiver(s)

Positioning Component — 398

Data Bus — 392

Memory

Positioning Component

Positioning Component

Processor(s)

Positioning Component — 394

396    398         398              398

500 ⟍

550 ⟍

600

602 NG-RAN node

270 LMF

POSITIONING ACTIVATION REQUEST ——610

POSITIONING ACTIVATION RESPONSE ——620

700

702 NG-RAN node

270 LMF

MEASUREMENT REQUEST ——710

MEASUREMENT RESPONSE ——720

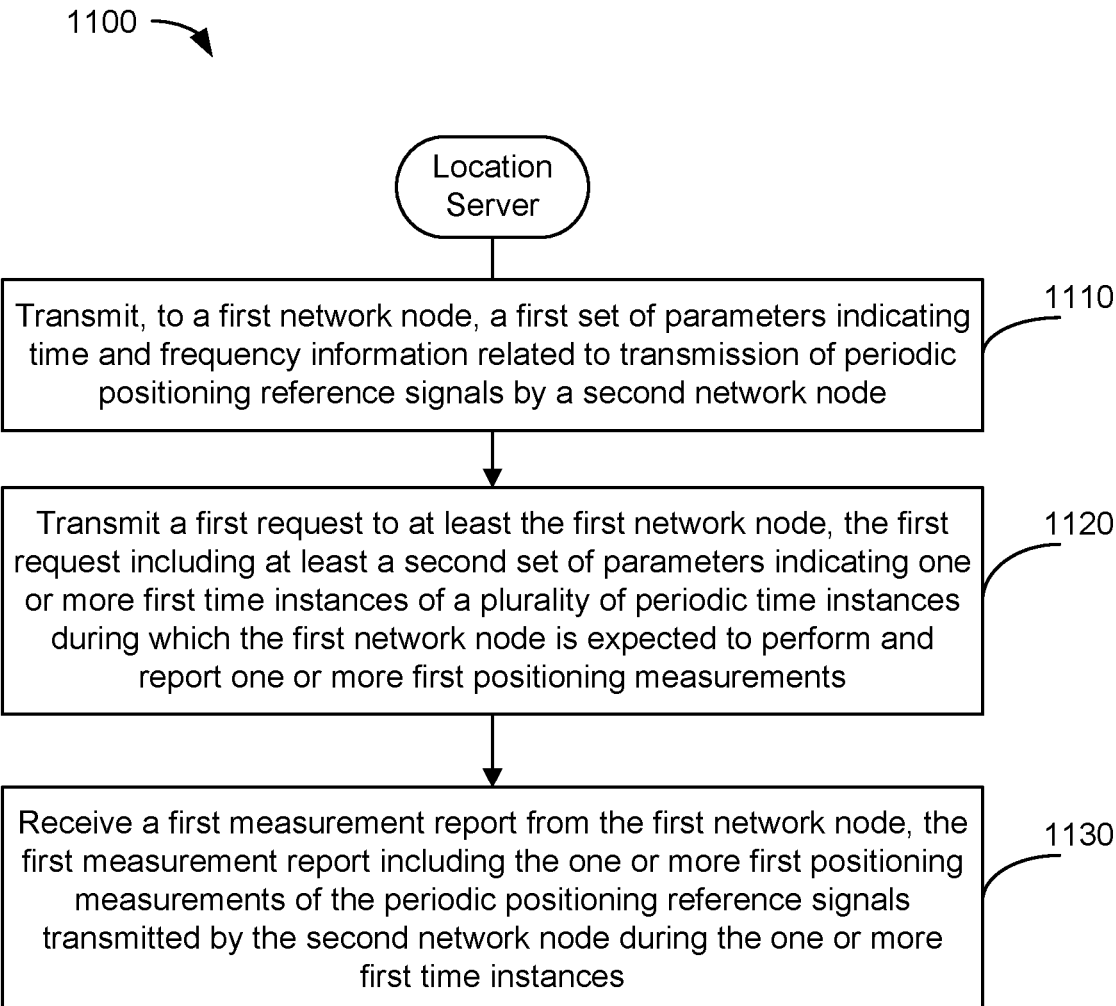

1100

Location
Server

Transmit, to a first network node, a first set of parameters indicating
time and frequency information related to transmission of periodic
positioning reference signals by a second network node — 1110

Transmit a first request to at least the first network node, the first
request including at least a second set of parameters indicating one
or more first time instances of a plurality of periodic time instances
during which the first network node is expected to perform and
report one or more first positioning measurements — 1120

Receive a first measurement report from the first network node, the
first measurement report including the one or more first positioning
measurements of the periodic positioning reference signals
transmitted by the second network node during the one or more
first time instances — 1130

FIG. 11

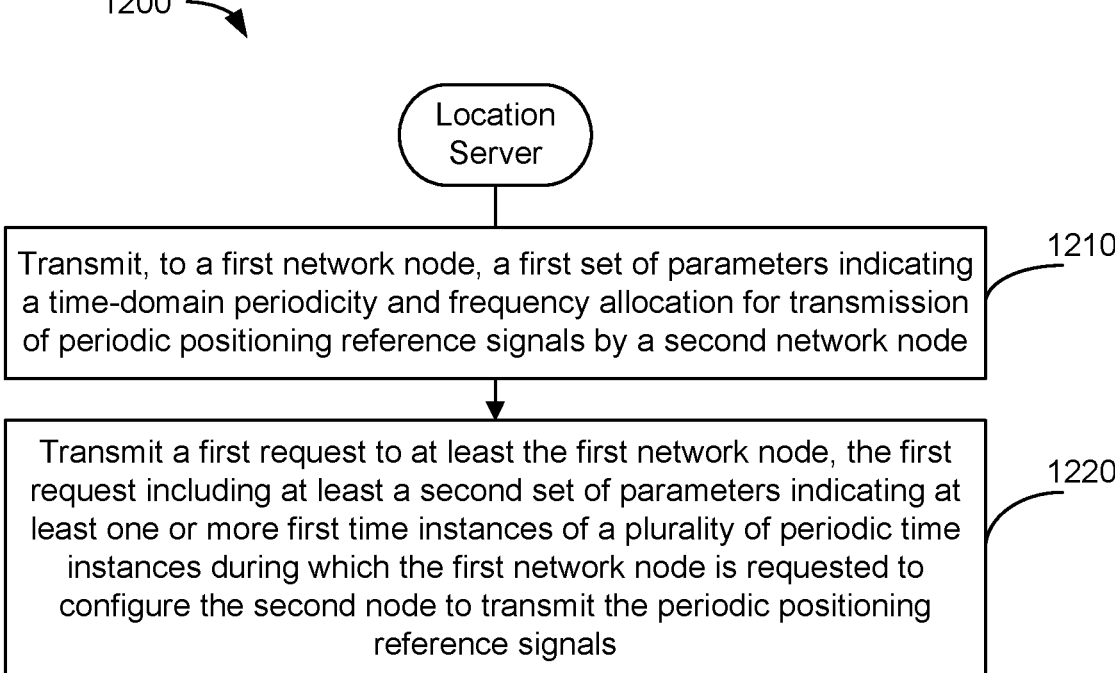

1200

Location
Server

Transmit, to a first network node, a first set of parameters indicating a time-domain periodicity and frequency allocation for transmission of periodic positioning reference signals by a second network node          1210

Transmit a first request to at least the first network node, the first request including at least a second set of parameters indicating at least one or more first time instances of a plurality of periodic time instances during which the first network node is requested to configure the second node to transmit the periodic positioning reference signals          1220

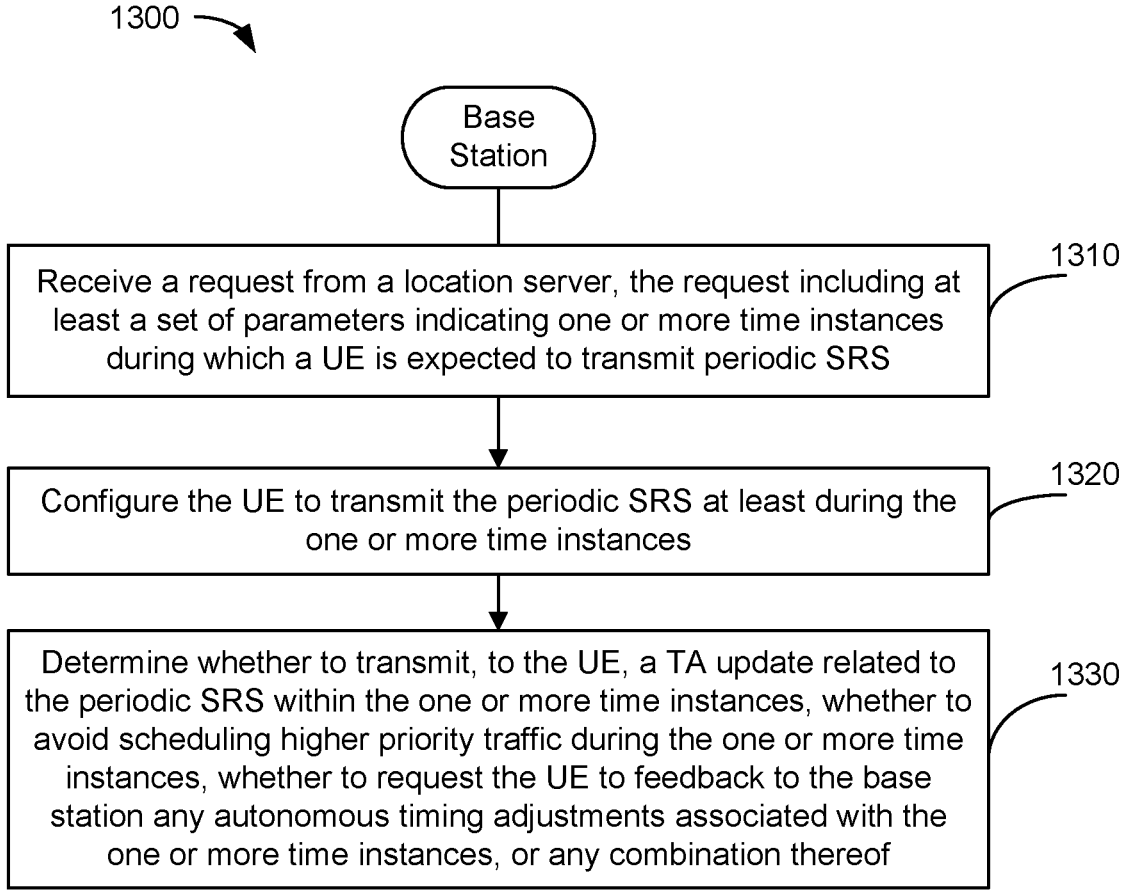

Base Station

Receive a request from a location server, the request including at least a set of parameters indicating one or more time instances during which a UE is expected to transmit periodic SRS
1310

Configure the UE to transmit the periodic SRS at least during the one or more time instances
1320

Determine whether to transmit, to the UE, a TA update related to the periodic SRS within the one or more time instances, whether to avoid scheduling higher priority traffic during the one or more time instances, whether to request the UE to feedback to the base station any autonomous timing adjustments associated with the one or more time instances, or any combination thereof
1330

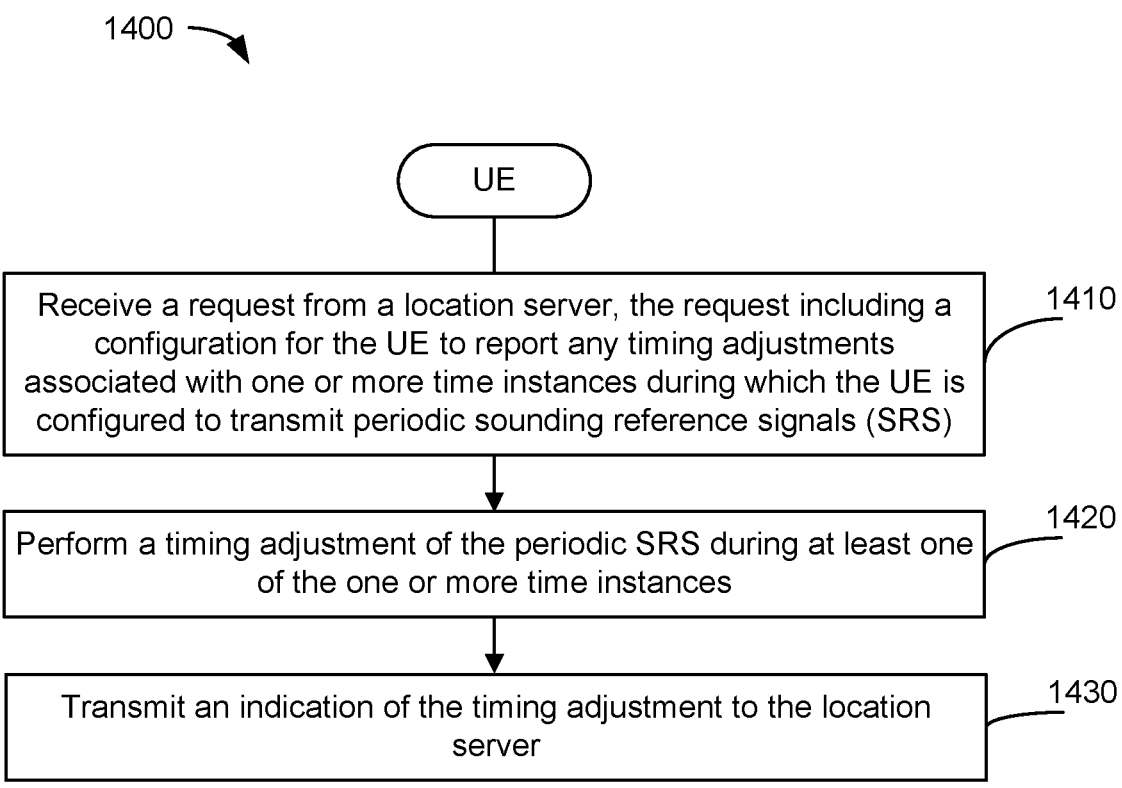

UE

Receive a request from a location server, the request including a
configuration for the UE to report any timing adjustments
associated with one or more time instances during which the UE is
configured to transmit periodic sounding reference signals (SRS)          1410

Perform a timing adjustment of the periodic SRS during at least one
of the one or more time instances          1420

Transmit an indication of the timing adjustment to the location
server          1430

QoS ::= SEQUENCE {
    horizontalAccuracy            HorizontalAccuracy      OPTIONAL,
    verticalCoordinateRequest     BOOLEAN,
    verticalAccuracy              VerticalAccuracy        OPTIONAL,
    responseTime                  ResponseTime            OPTIONAL,
    velocityRequest               BOOLEAN,
    ...,
    [[  responseTimeNB-r14        ResponseTimeNB-r14      OPTIONAL
    ]],
    [[  horizontalAccuracyExt-r15 HorizontalAccuracyExt-r15   OPTIONAL,
        verticalAccuracyExt-r15   VerticalAccuracyExt-r15     OPTIONAL
    ]]
}
```

*FIG. 15*

FACILITATING TIME-ALIGNED MEASUREMENTS FOR USER EQUIPMENTS (UES) AND BASE STATIONS FOR POSITIONING

CROSS-REFERENCE TO RELATED APPLICATIONS

The present application for patent claims priority to Indian Patent Application No. 202141002131, entitled "FACILITATING TIME-ALIGNED MEASUREMENT AND REPORTING FOR USER EQUIPMENTS (UES) AND BASE STATIONS FOR MULTI-ROUND-TRIP-TIME (M-RTT) POSITIONING," filed Jan. 17, 2021, and is a national stage application, filed under 35 U.S.C. § 371, of International Patent Application No. PCT/US2021/072825, entitled "FACILITATING TIME-ALIGNED MEASURE-MENTS FOR USER EQUIPMENTS (UES) AND BASE STATIONS FOR POSITIONING," filed Dec. 9, 2021, both of which are assigned to the assignee hereof and expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of communication performed by a location server includes transmitting, to a first network node, a first set of parameters indicating time and frequency information related to transmission of periodic positioning reference signals by a second network node; transmitting a first request to at least the first network node, the first request including at least a second set of parameters indicating one or more first time instances of the plurality of periodic time instances during which the first network node is expected to perform and report one or more first positioning measurements; and receiving a first measurement report from the first network node, the first measurement report including the one or more first positioning measurements of the periodic positioning reference signals transmitted by the second network node during the one or more first time instances.

In an aspect, a method of communication performed by a location server includes transmitting, to a first network node, a first set of parameters indicating a time-domain periodicity and frequency allocation for transmission of periodic positioning reference signals by a second network node; and transmitting a first request to the first network node, the first request including at least a second set of parameters indicating at least one or more first time instances of the plurality of periodic time instances during which the first network node is requested to configure the second node to transmit the periodic positioning reference signals.

In an aspect, a method of communication performed by a serving base station includes receiving a request from a location server, the request including at least a set of parameters indicating one or more time instances during which a user equipment (UE) is expected to transmit periodic sounding reference signals (SRS); configuring the UE to transmit the periodic SRS at least during the one or more time instances; and determining whether to transmit, to the UE, a timing adjust (TA) update related to the periodic SRS within the one or more time instances, whether to avoid scheduling higher priority traffic during the one or more time instances, whether to request the UE to feedback to the base station any autonomous timing adjustments associated with the one or more time instances, or any combination thereof.

In an aspect, a method of wireless communication performed by a user equipment (UE) includes receiving a request from a location server, the request including a configuration for the UE to report any timing adjustments associated with one or more time instances during which the UE is configured to transmit periodic sounding reference signals (SRS); performing a timing adjustment of the periodic SRS during at least one of the one or more time instances; and transmitting an indication of the timing adjustment to the location server.

In an aspect, a location server includes a memory; at least one transceiver; and at least one processor communicatively coupled to the memory and the at least one transceiver, the at least one processor configured to: transmit, via the at least one transceiver, to a first network node, a first set of parameters indicating time and frequency information related to transmission of periodic positioning reference signals by a second network node; transmit, via the at least one transceiver, a first request to at least the first network node, the first request including at least a second set of parameters indicating one or more first time instances of a plurality of periodic time instances during which the first network node is expected to perform and report one or more first positioning measurements; and receive, via the at least one transceiver, a first measurement report from the first network node, the first measurement report including the one or more first positioning measurements of the periodic positioning reference signals transmitted by the second network node during the one or more first time instances.

In an aspect, a location server includes a memory; at least one transceiver; and at least one processor communicatively coupled to the memory and the at least one transceiver, the at least one processor configured to: transmit, via the at least one transceiver, to a first network node, a first set of parameters indicating a time-domain periodicity and frequency allocation for transmission of periodic positioning reference signals by a second network node; and transmit, via the at least one transceiver, a first request to the first network node, the first request including at least a second set of parameters indicating at least one or more first time instances of a plurality of periodic time instances during which the first network node is requested to configure the second node to transmit the periodic positioning reference signals.

In an aspect, a base station includes a memory; at least one transceiver; and at least one processor communicatively coupled to the memory and the at least one transceiver, the at least one processor configured to: receive, via the at least one transceiver, a request from a location server, the request including at least a set of parameters indicating one or more time instances during which a user equipment (UE) is expected to transmit periodic sounding reference signals (SRS); configure the UE to transmit the periodic SRS at least during the one or more time instances; and determine whether to transmit, to the UE, a timing adjust (TA) update related to the periodic SRS within the one or more time instances, whether to avoid scheduling higher priority traffic during the one or more time instances, whether to request the UE to feedback to the base station any autonomous timing adjustments associated with the one or more time instances, or any combination thereof.

In an aspect, a user equipment (UE) includes a memory; at least one transceiver; and at least one processor communicatively coupled to the memory and the at least one transceiver, the at least one processor configured to: receive, via the at least one transceiver, a request from a location server, the request including a configuration for the UE to report any timing adjustments associated with one or more time instances during which the UE is configured to transmit periodic sounding reference signals (SRS); perform a timing adjustment of the periodic SRS during at least one of the one or more time instances; and transmit, via the at least one transceiver, an indication of the timing adjustment to the location server.

In an aspect, a location server includes means for transmitting, to a first network node, a first set of parameters indicating time and frequency information related to transmission of periodic positioning reference signals by a second network node; means for transmitting a first request to at least the first network node, the first request including at least a second set of parameters indicating one or more first time instances of a plurality of periodic time instances during which the first network node is expected to perform and report one or more first positioning measurements; and means for receiving a first measurement report from the first network node, the first measurement report including the one or more first positioning measurements of the periodic positioning reference signals transmitted by the second network node during the one or more first time instances.

In an aspect, a location server includes means for transmitting, to a first network node, a first set of parameters indicating a time-domain periodicity and frequency allocation for transmission of periodic positioning reference signals by a second network node; and means for transmitting a first request to the first network node, the first request including at least a second set of parameters indicating at least one or more first time instances of a plurality of periodic time instances during which the first network node is requested to configure the second node to transmit the periodic positioning reference signals.

In an aspect, a base station includes means for receiving a request from a location server, the request including at least a set of parameters indicating one or more time instances during which a user equipment (UE) is expected to transmit periodic sounding reference signals (SRS); means for configuring the UE to transmit the periodic SRS at least during the one or more time instances; and means for determining whether to transmit, to the UE, a timing adjust (TA) update related to the periodic SRS within the one or more time instances, whether to avoid scheduling higher priority traffic during the one or more time instances, whether to request the UE to feedback to the base station any autonomous timing adjustments associated with the one or more time instances, or any combination thereof.

In an aspect, a user equipment (UE) includes means for receiving a request from a location server, the request including a configuration for the UE to report any timing adjustments associated with one or more time instances during which the UE is configured to transmit periodic sounding reference signals (SRS); means for performing a timing adjustment of the periodic SRS during at least one of the one or more time instances; and means for transmitting an indication of the timing adjustment to the location server.

In an aspect, a non-transitory computer-readable medium stores computer-executable instructions that, when executed by a location server, cause the location server to: transmit, to a first network node, a first set of parameters indicating time and frequency information related to transmission of periodic positioning reference signals by a second network node; transmit a first request to at least the first network node, the first request including at least a second set of parameters indicating one or more first time instances of a plurality of periodic time instances during which the first network node is expected to perform and report one or more first positioning measurements; and receive a first measurement report from the first network node, the first measurement report including the one or more first positioning measurements of the periodic positioning reference signals transmitted by the second network node during the one or more first time instances.

In an aspect, a non-transitory computer-readable medium stores computer-executable instructions that, when executed by a location server, cause the location server to: transmit, to a first network node, a first set of parameters indicating a time-domain periodicity and frequency allocation for transmission of periodic positioning reference signals by a second network node; and transmit a first request to the first network node, the first request including at least a second set of parameters indicating at least one or more first time instances of a plurality of periodic time instances during which the first network node is requested to configure the second node to transmit the periodic positioning reference signals.

In an aspect, a non-transitory computer-readable medium stores computer-executable instructions that, when executed by a base station, cause the base station to: receive a request from a location server, the request including at least a set of parameters indicating one or more time instances during which a user equipment (UE) is expected to transmit periodic sounding reference signals (SRS); configure the UE to transmit the periodic SRS at least during the one or more time instances; and determine whether to transmit, to the UE, a timing adjust (TA) update related to the periodic SRS within the one or more time instances, whether to avoid scheduling higher priority traffic during the one or more time instances, whether to request the UE to feedback to the base station any autonomous timing adjustments associated with the one or more time instances, or any combination thereof.

In an aspect, a non-transitory computer-readable medium stores computer-executable instructions that, when executed by a user equipment (UE), cause the UE to: receive a request from a location server, the request including a configuration for the UE to report any timing adjustments associated with one or more time instances during which the UE is configured to transmit periodic sounding reference signals (SRS); perform a timing adjustment of the periodic SRS during at least one of the one or more time instances; and transmit an indication of the timing adjustment to the location server.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 11 to 14 illustrate example methods of communication, according to aspects of the disclosure.

FIG. 15 illustrates an example Long-Term Evolution (LTE) positioning protocol (LPP) quality of service (QoS) information element (IE), according to aspects of the disclosure.

DETAILED DESCRIPTION

Figure 1:
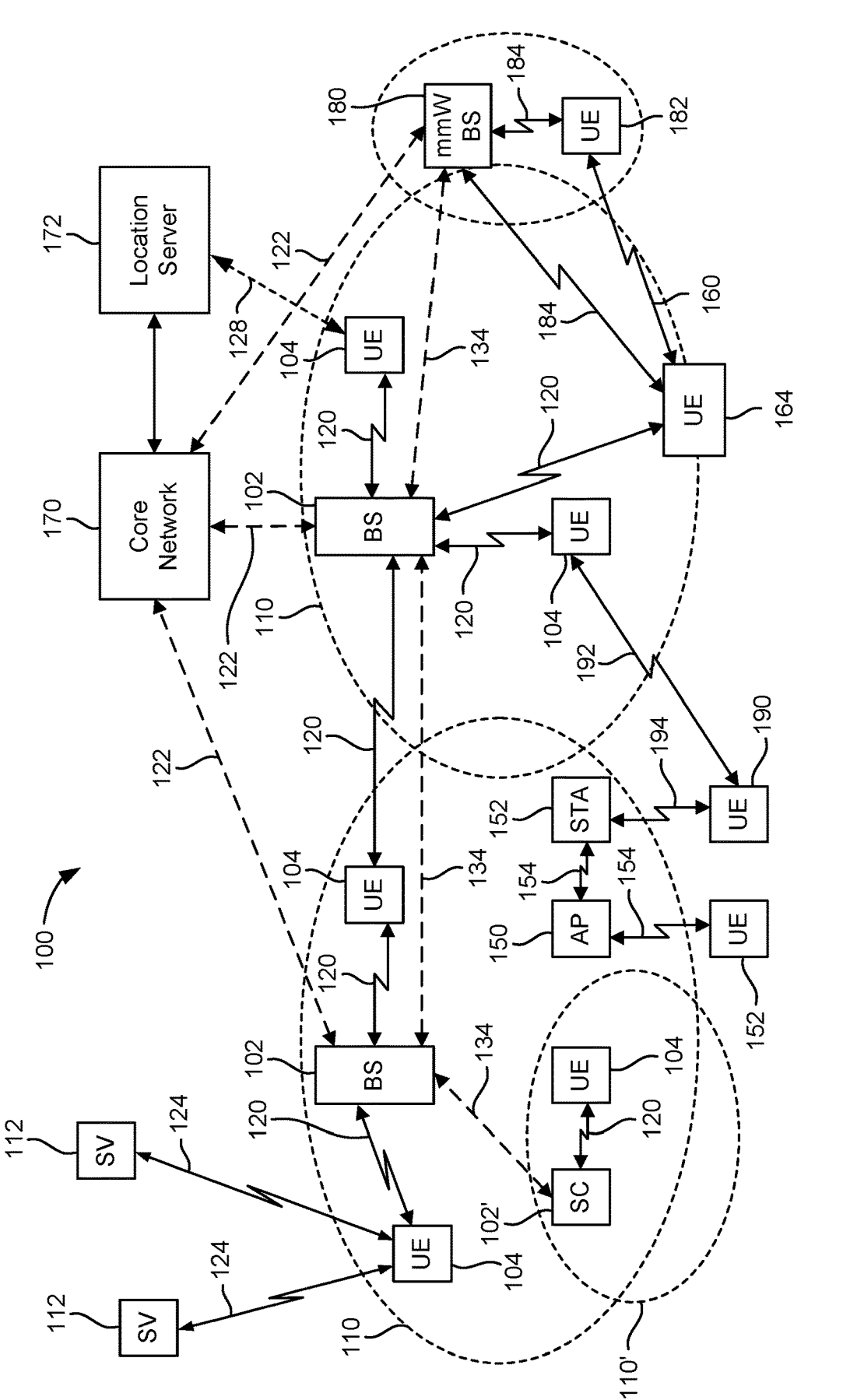
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used

US 12,672,091 B2

7 herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be

8 referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or 9
10 indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
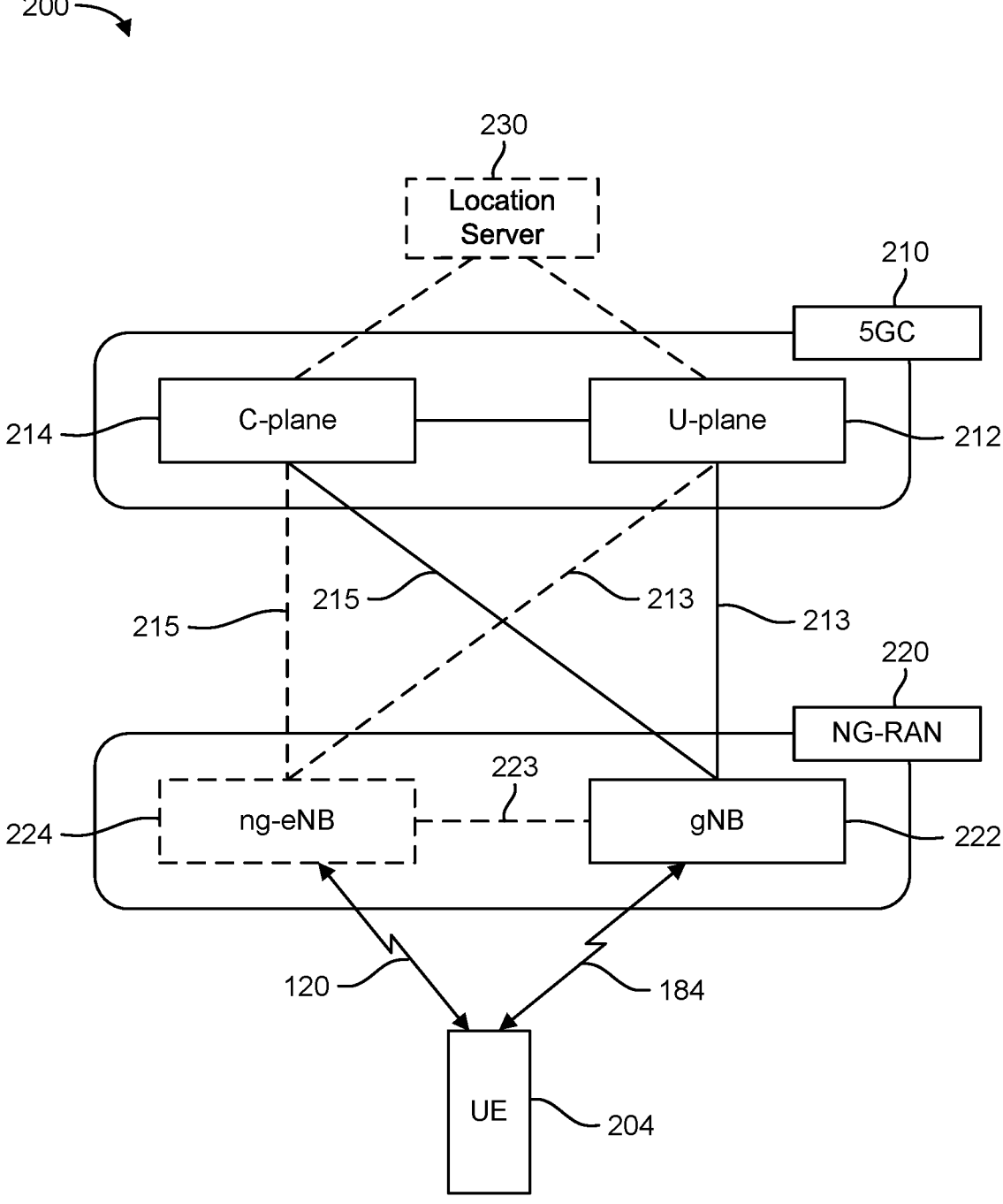
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
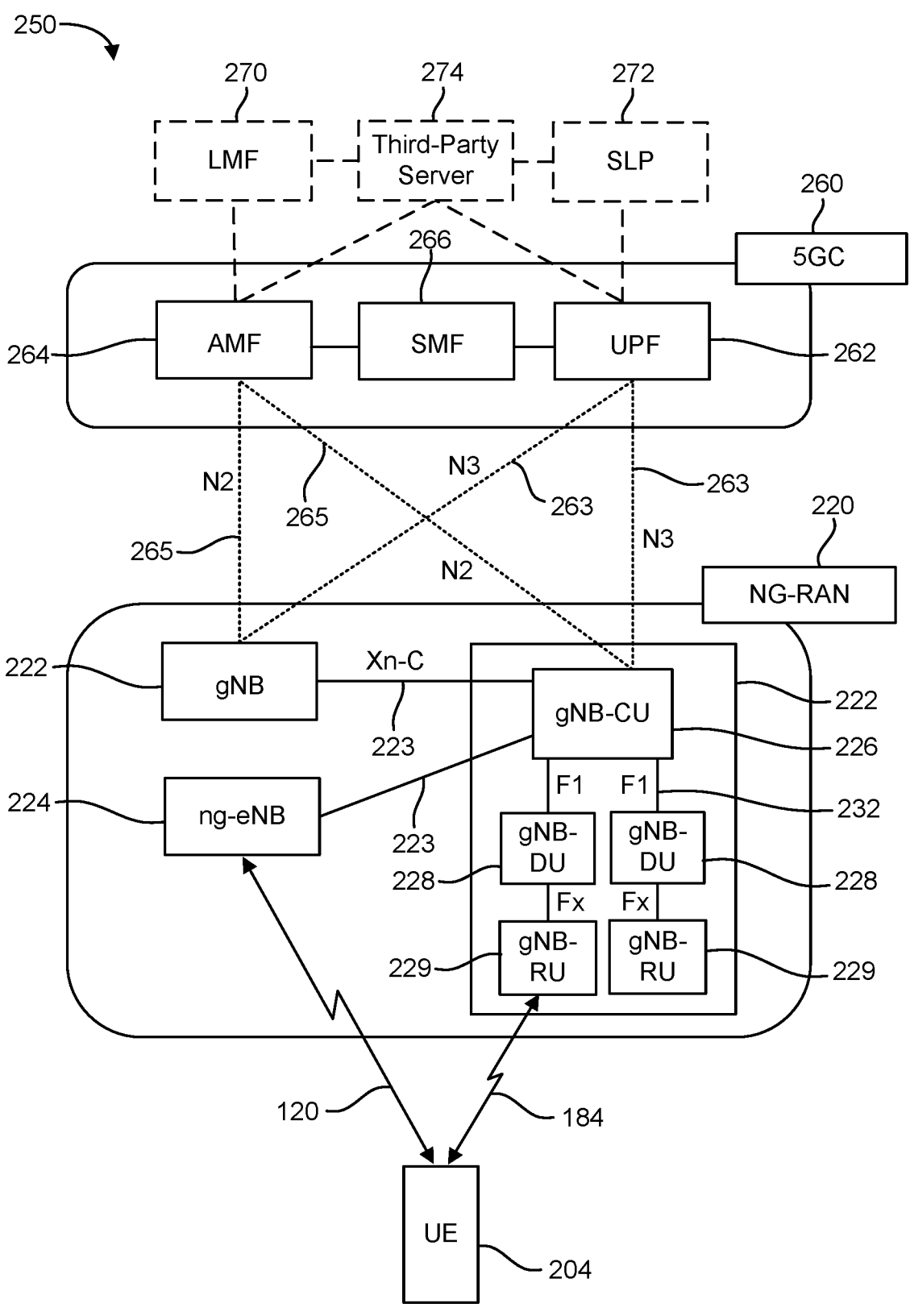

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F 1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
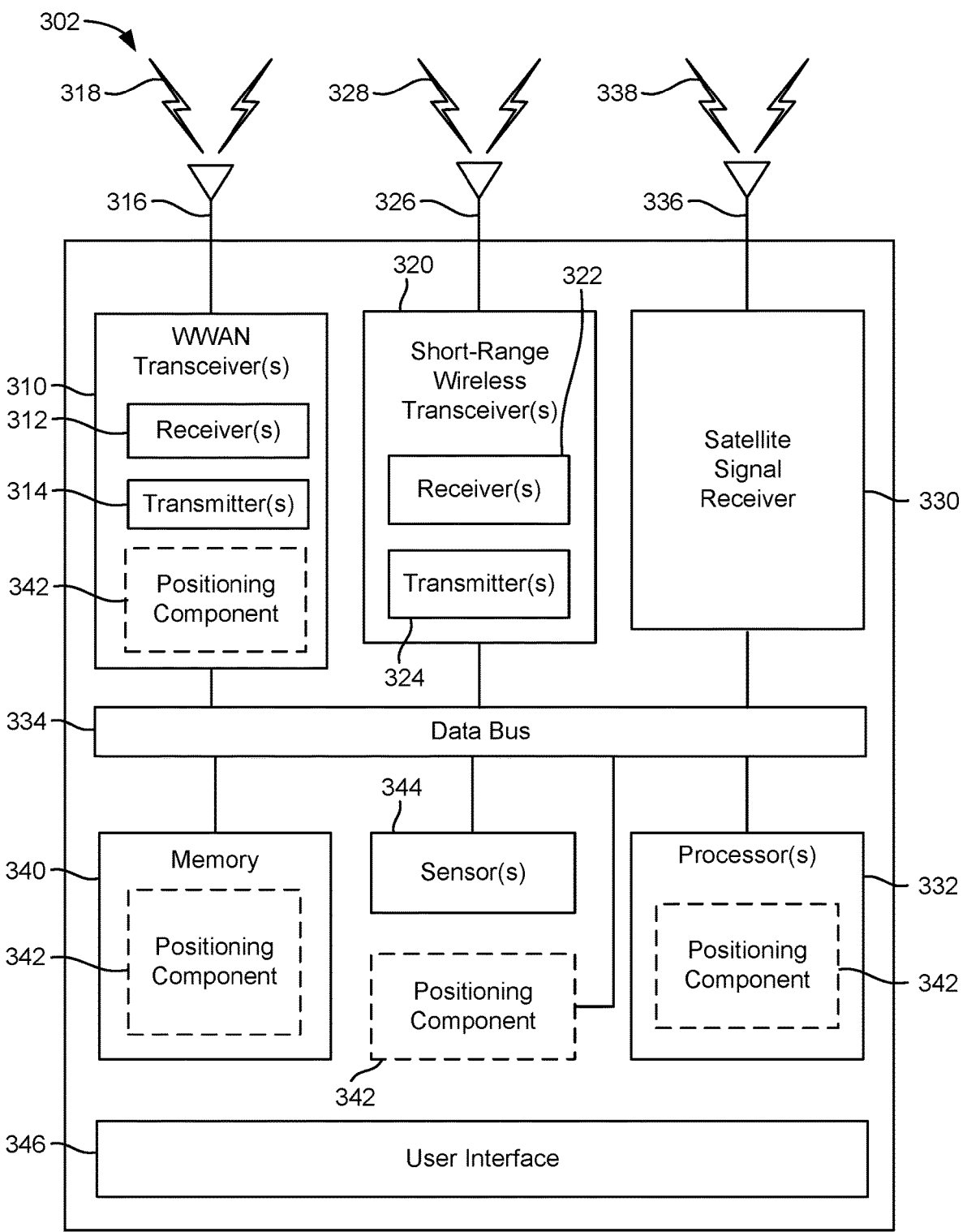
FIGS. 3A to 3C are simplified block diagrams of several sample aspects of components that may be employed in a user equipment (UE), a base station, and a network entity, respectively, and configured to support communications as taught herein.
Figure 3B:
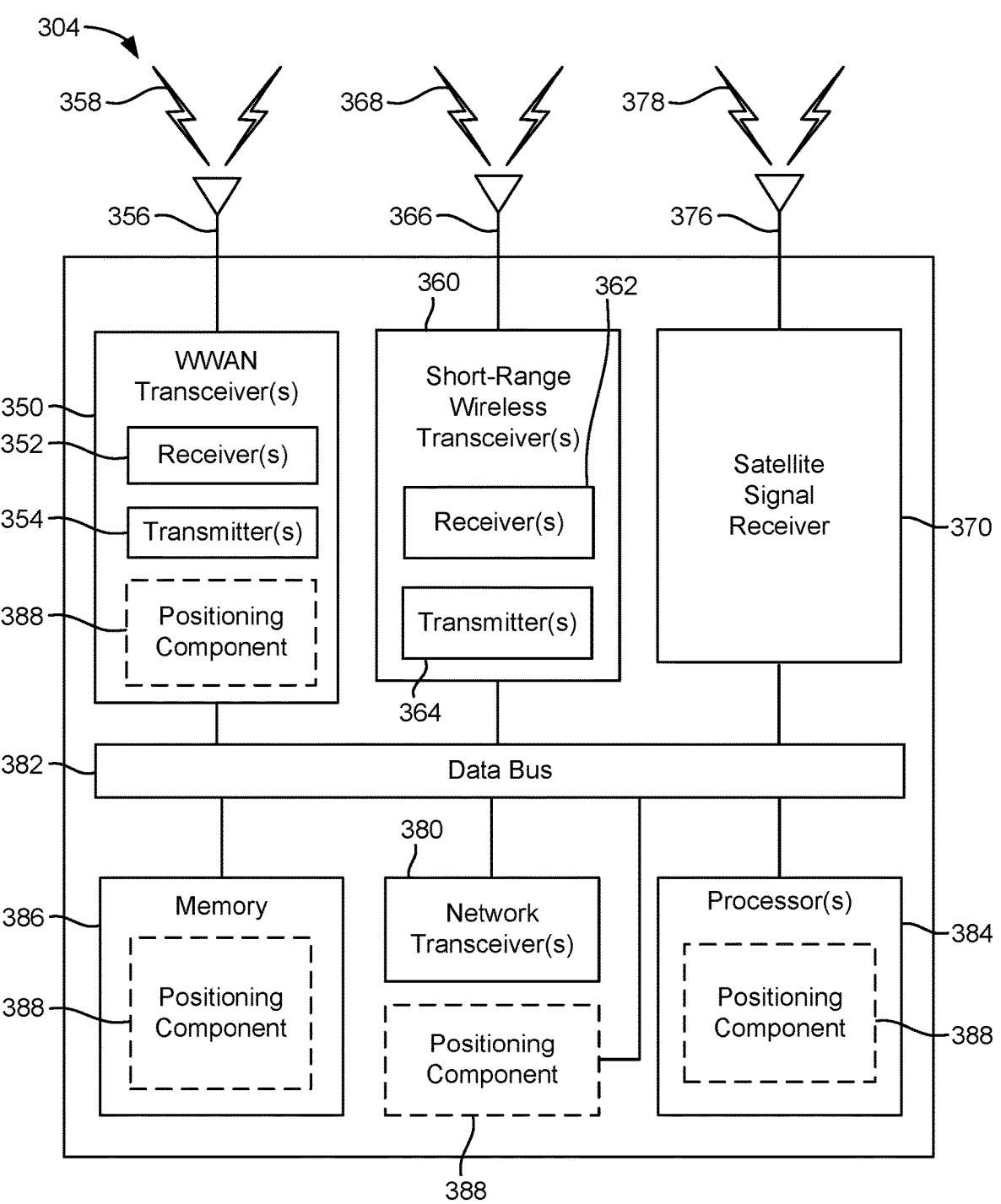
Figure 3C:
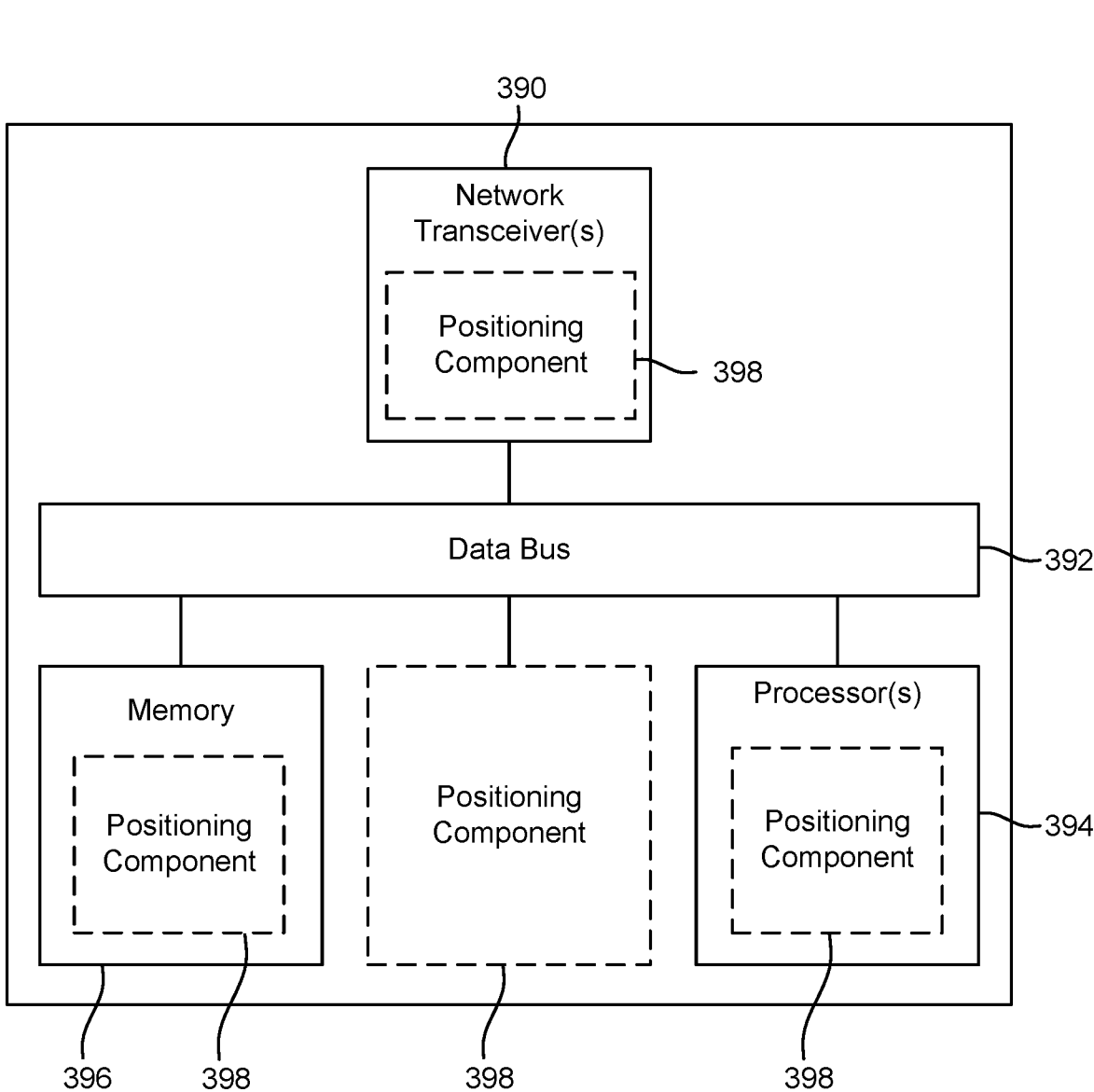

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PCS, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cell s/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method.

Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds ($\mu$s). In some cases, when any of the resources used for the positioning measurement are in FR1, the value range for the uncertainty of the expected RSTD may be +/−32 $\mu$s. In other cases, when all of the resources used for the positioning measurement(s) are in FR2, the value range for the uncertainty of the expected RSTD may be +/−8 $\mu$s.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4:
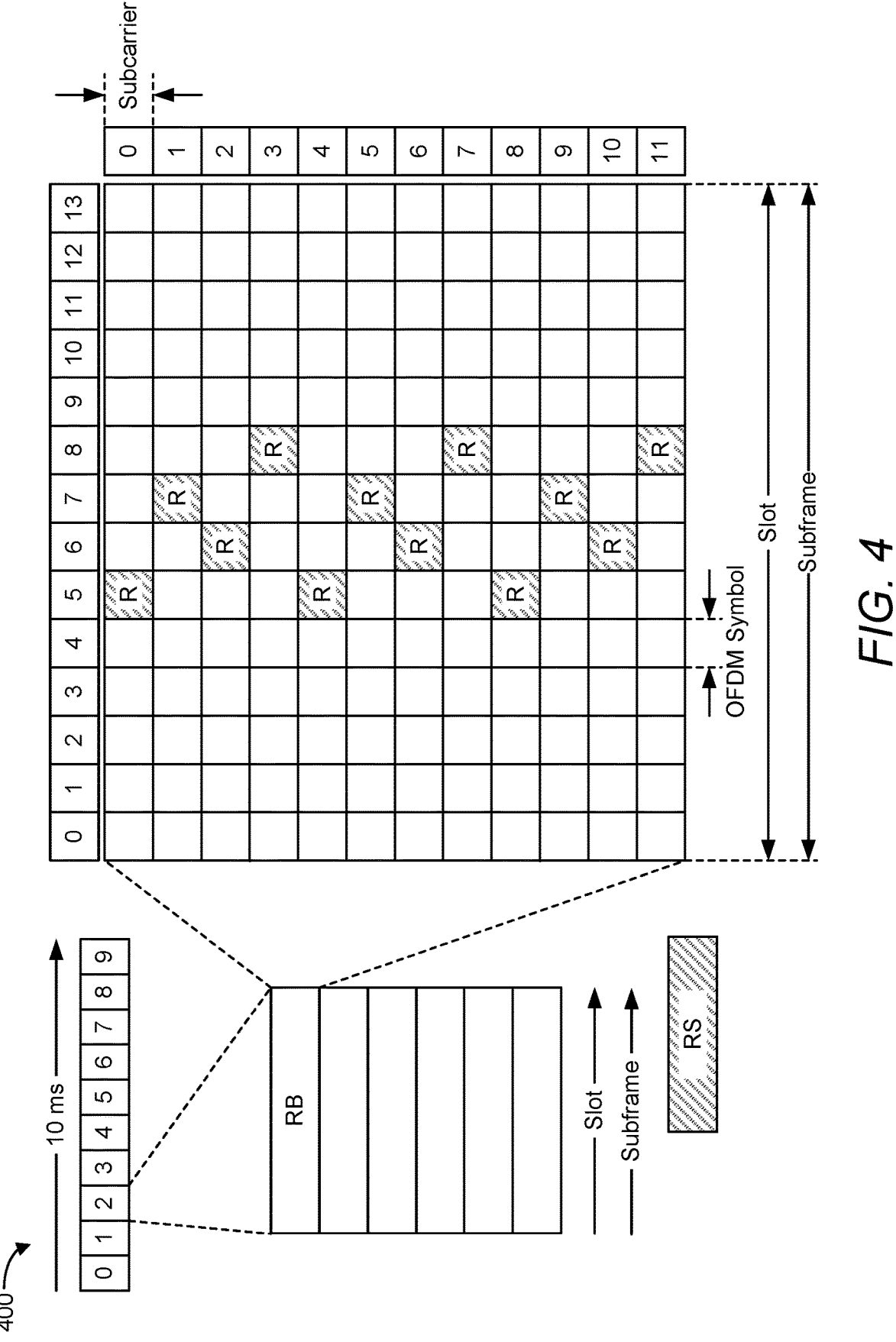
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of kHz (v0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS (v0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (v2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 1}; 6-symbol comb-2: {0, 1, 0, 1, 0, 1}; 12-symbol comb-2: {0, 1, 0, 1, 0, 1, 0, 1, 0, 1}; 4-symbol comb-4: {0, 2, 1, 3} (as in the example of FIG. 4); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu$*{4, 5, 8, 10, 16, 20, 32, 40, 64, 80, 160, 320, 640, 1280, 2560, 5120, 10240} slots, with $\mu$=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where

US 12,672,091 B2

29

"ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

In an aspect, the reference signal carried on the REs labeled "R" in FIG. 4 may be SRS. SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs. An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource. In the example of FIG. 4, the illustrated SRS is comb-4 over four symbols. That is, the locations of the shaded SRS REs indicate a comb-4 SRS resource configuration.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 2-symbol comb-4: {0, 2}; 4-symbol comb-2: {0, 1, 0, 1}; 4-symbol comb-4: {0, 2, 1, 3} (as in the example of FIG. 4); 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

Generally, as noted above, a UE transmits SRS to enable the receiving base station (either the serving base station or a neighboring base station) to measure the channel quality

30

(i.e., CSI) between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" or "positioning SRS" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through a MAC control element (MAC-CE) or downlink control information (DCI)).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink, uplink, or sidelink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PTRS) may be referred to as an "UL-PRS," and a sidelink positioning reference signal may be referred to as an "SL-PRS." In addition, for signals that may be transmitted in the downlink, uplink, and/or sidelink (e.g., DMRS), the signals may be prepended with "DL," "UL," or "SL" to distinguish the direction. For example, "UL-DMRS" is different from "DL-DMRS."

Generally, a UE's serving base station configures the UE to transmit SRS, whether SRS-for-communication or SRS-for-positioning. Although an LMF generally schedules the PRS transmitted by the involved base stations and calculates the estimate of the UE's location, the LMF has only limited input regarding the SRS configuration for the UE being located. The following figures illustrate an LMF's interaction with an NG-RAN node to specify parameters of a UE's SRS configuration.

Figure 5A:
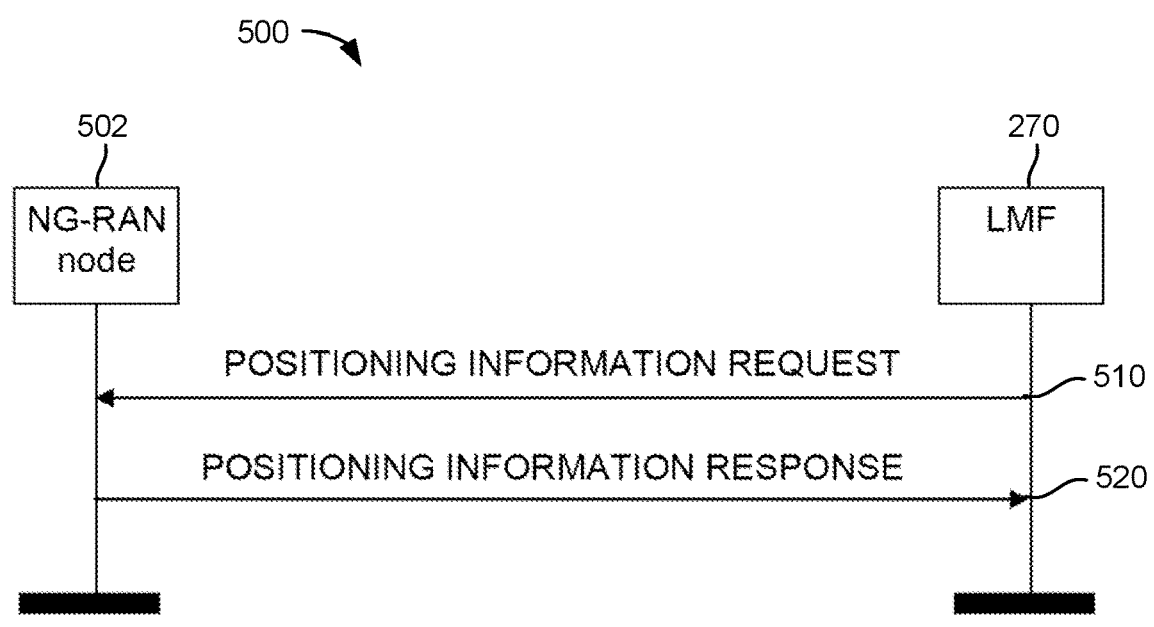
FIGS. 5A and 5B illustrate example positioning information exchange procedures between a network node and a location server, according to aspects of the disclosure.
Figure 5B:
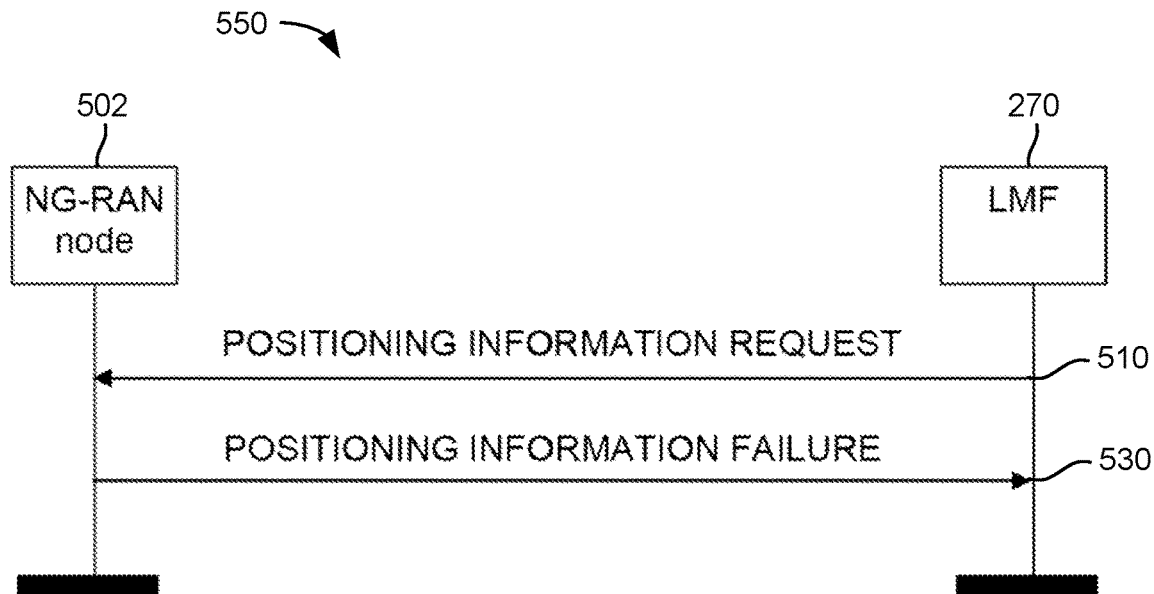

FIGS. 5A and 5B illustrate example positioning information exchange procedures between an NG-RAN node 502 and an LMF 270, according to aspects of the disclosure. The NG-RAN node 502 may be any type of NG-RAN access point capable of providing NR connectivity to another device. For example, the NG-RAN node 502 may be a gNB (e.g., gNB 222), an ng-eNB (e.g., ng-eNB 224), or the like.

A positioning information exchange procedure is initiated by the LMF 270 to request positioning information for a UE (not shown) from the NG-RAN node 502. FIG. 5A illustrates an example of a successful positioning information exchange procedure 500. The LMF 270 initiates the positioning information exchange procedures 500 by sending, at 510, a POSITIONING INFORMATION REQUEST message (e.g., for an NR Positioning Protocol A (NRPPa)) to the NG-RAN node 502.

The POSITIONING INFORMATION REQUEST message may include the following information elements (IEs): "Message Type" (mandatory), "NRPPa Transaction ID" (mandatory), and "Requested SRS Transmission Characteristics" (optional). The "Requested SRS Transmission Characteristics" IE may include the following information: the number of SRS transmissions (optional), the SRS resource type (periodic, semi-persistent, aperiodic), the bandwidth of the SRS, and a list of SRS resource set sequences (optional). The number of SRS transmissions is present if the SRS are periodic, and may have a value of 0 to 500. If the "Requested SRS Transmission Characteristics" IE is included in the POSITIONING INFORMATION REQUEST message, the NG-RAN node 502 may take this information into account when configuring SRS transmissions for the UE.

Note that "NRPPa" stands for "New Radio positioning protocol type A." NRPPa is the communication protocol between an LMF (e.g., LMF 270) and an NG-RAN node (e.g., NG-RAN node 502).

At 520, the NG-RAN node 502 replies to the POSITIONING INFORMATION REQUEST message with a POSITIONING INFORMATION RESPONSE message (e.g., for NRPPa). The POSITIONING INFORMATION RESPONSE message may include the following IEs: "Message Type" (mandatory), "NRPPa Transaction ID" (mandatory), "SRS Configuration" (optional), "SFN Initialisation Time" (optional), and "Criticality Diagnostics" (optional). Although optional, the NG-RAN node 502 is expected to include the "SRS Configuration" and "SFN Initialisation Time" IEs in the POSITIONING INFORMATION RESPONSE message.

FIG. 5B illustrates an example of an unsuccessful positioning information exchange procedure 550. Operation 510 of the positioning information exchange procedure 550 is the same as operation 510 of the positioning information exchange procedure 500. In this case, however, if the "Requested SRS Transmission Characteristics" IE is included in the POSITIONING INFORMATION REQUEST message and the NG-RAN node 502 is unable to configure any SRS transmissions for the UE, then at 530, it is expected to respond with a POSITIONING INFORMATION FAILURE message (e.g., for NRPPa). If the failure is due to a handover of the target UE having been triggered, the NG-RAN node 502 is expected to send a POSITIONING INFORMATION FAILURE message with an appropriate cause value (e.g., indicating that the failure is due to a handover).

Figure 6:
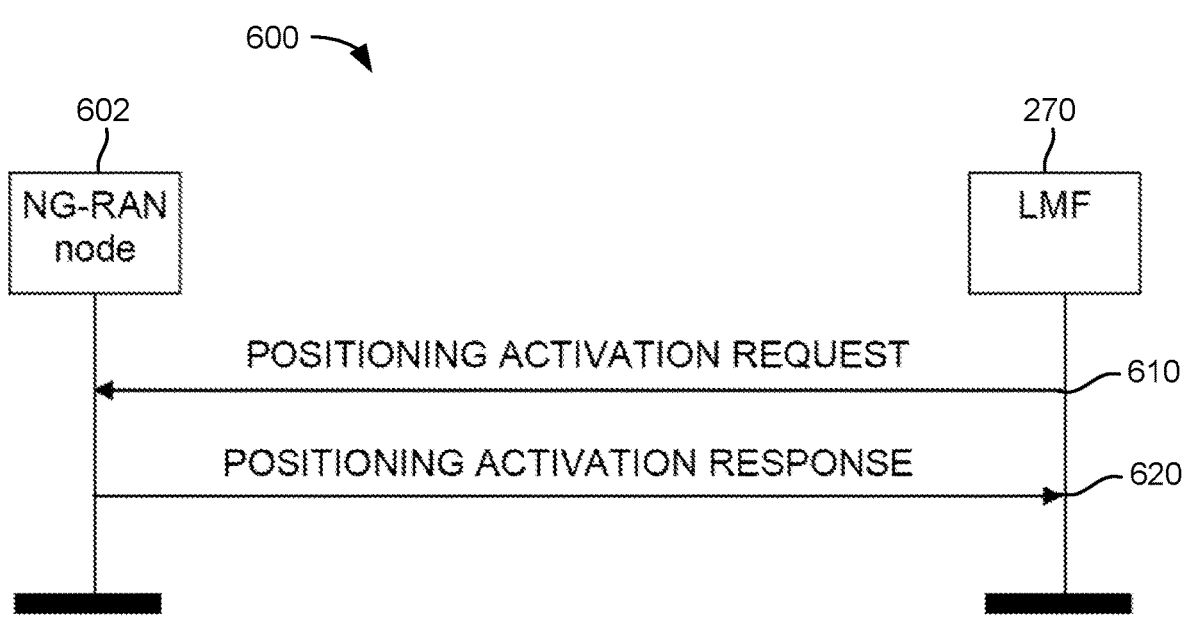
FIG. 6 illustrates an example positioning activation procedure between a network node and a location server, according to aspects of the disclosure.

FIG. 6 illustrates an example positioning activation procedure 600 between an NG-RAN node 602 and an LMF 270, according to aspects of the disclosure. The NG-RAN node 602 may correspond to the NG-RAN node 502.

The positioning activation procedure 600 is initiated by the LMF 270 to request the NG-RAN node 602 to activate semi-persistent or trigger aperiodic UL SRS transmission by a UE (not shown). The LMF 270 initiates the positioning activation procedure 600 by sending, at 610, a POSITIONING ACTIVATION REQUEST message (e.g., for NRPPa) to the NG-RAN node 602. For semi-persistent SRS, the POSITIONING ACTIVATION REQUEST message includes an indication of the SRS resource set to be activated and may include the spatial relation for the semi-persistent SRS resource to be activated. For aperiodic SRS, if the "SRS Resource Trigger" IE is included in the POSITIONING ACTIVATION REQUEST message, the NG-RAN node 602 is expected to take the value of this IE into account when triggering aperiodic SRS transmission by the UE. If the "Activation Time" IE is included in the POSITIONING ACTIVATION REQUEST message, the NG-RAN node 602 is expected to take the indicated value as the LMF's 270 requested time for activation of the UE's SRS transmission.

Following successful activation of SRS transmission in the UE, the NG-RAN node 602 responds with a POSITIONING ACTIVATION RESPONSE message (e.g., for NRPPa) at 620. If the POSITIONING ACTIVATION RESPONSE message includes the "System Frame Number" and/or the "Slot Number" IEs, the LMF 270 is expected to consider that the respective information indicates the activation time of SRS transmission by the UE.

Figure 7:
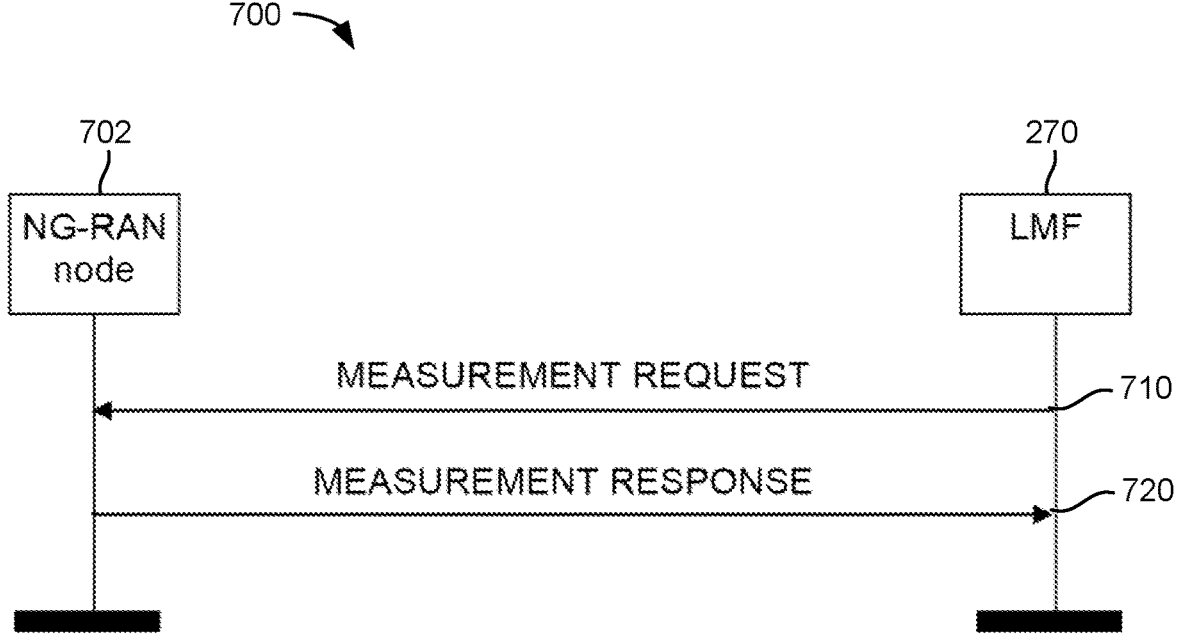
FIG. 7 illustrates an example measurement procedure between a network node and a location server, according to aspects of the disclosure.

FIG. 7 illustrates an example measurement procedure 700 between an NG-RAN node 702 and an LMF 270, according to aspects of the disclosure. The NG-RAN node 702 may correspond to the NG-RAN node 502 or 602.

The measurement procedure 700 allows the LMF 270 to request one or more TRPs of the NG-RAN node to perform and report positioning measurements. The LMF 270 initiates the procedure by sending, at 710, a MEASUREMENT REQUEST message (e.g., for NRPPa) to the NG-RAN node. The MEASUREMENT REQUEST message includes the following IEs: "Message Type" (mandatory), "NRPPa Transaction ID" (mandatory), "LMF Measurement ID" (mandatory), "TRP Measurement Request List," "Report Characteristics" (mandatory), and "Measurement Periodicity." The "TRP Measurement Request List" IE indicates the TRP(s) from which measurements are requested, and includes one or more "TRP Measurement Request Item" IEs. Each "TRP Measurement Request Item" IE includes the following IEs: "TRP ID" (mandatory), "Search Window Information" (optional), and "Cell ID" (optional). The "Measurement Periodicity" IE may have a value selected from the set of {120 ms, 240 ms, 480 ms, 740 ms, 1024 ms, 2048 ms, 5120 ms, 10240 ms, 1 min, 6 min, 12 min, 30 min, 60 min, . . . , 20480 ms, 40960 ms}.

The NG-RAN node 702 is expected to use the information included in the "TRP Measurement Request List" IE to configure positioning measurements by the indicated TRP(s). If at least one of the requested measurements has been successful for at least one of the TRPs, the NG-RAN node 702 replies, at 720, with a MEASUREMENT RESPONSE message (e.g., for NRPPa) including the "TRP Measurement Response List" IE.

If the "Report Characteristics" IE in the MEASUREMENT REQUEST message is set to "OnDemand," the NG-RAN node 702 is expected to return the corresponding measurement results in the MEASUREMENT RESPONSE message, and the LMF 270 is expected to consider that this reporting has been terminated by the NG-RAN node 702. If the "Report Characteristics" IE is set to "Periodic," the NG-RAN node 702 is expected to initiate the corresponding measurements, and to reply with the MEASUREMENT RESPONSE message without including any measurement results in the message. The NG-RAN node 702 is expected to then periodically initiate the measurement report procedure for the corresponding measurements, with the requested reporting periodicity.

If the "Measurement Beam Information Request" IE is included in the MEASUREMENT REQUEST message, the NG-RAN node 702 is expected to include the "Measurement Beam Information" IE in the "Measurement Result" IE of the MEASUREMENT RESPONSE message. If the "Measurement Quality" IE is included in the "Measurement Result" IE in the MEASUREMENT RESPONSE message, the LMF 270 may take it into account as the TRP estimate of the measurement quality. If the "Measurement Quality" IE includes the "Zenith Quality" IE, the LMF 270 may take it into account within the angle measurement quality.

For periodic SRS, the NG-RAN node 702 will send the measurement report periodically, but the NG-RAN node 702 decides which SRS instances it will measure. The LMF 270 is not able to recommend, suggest, or otherwise indicate the SRS instances it would prefer the NG-RAN node 702 to measure. For example, if the measurement periodicity is 120 milliseconds, (ms), the NG-RAN node 702 has to report to the LMF 270 every 120 ms, but the LMF 270 cannot indicate specific SRS instances to be measured and reported by the NG-RAN node 702.

Figure 8:
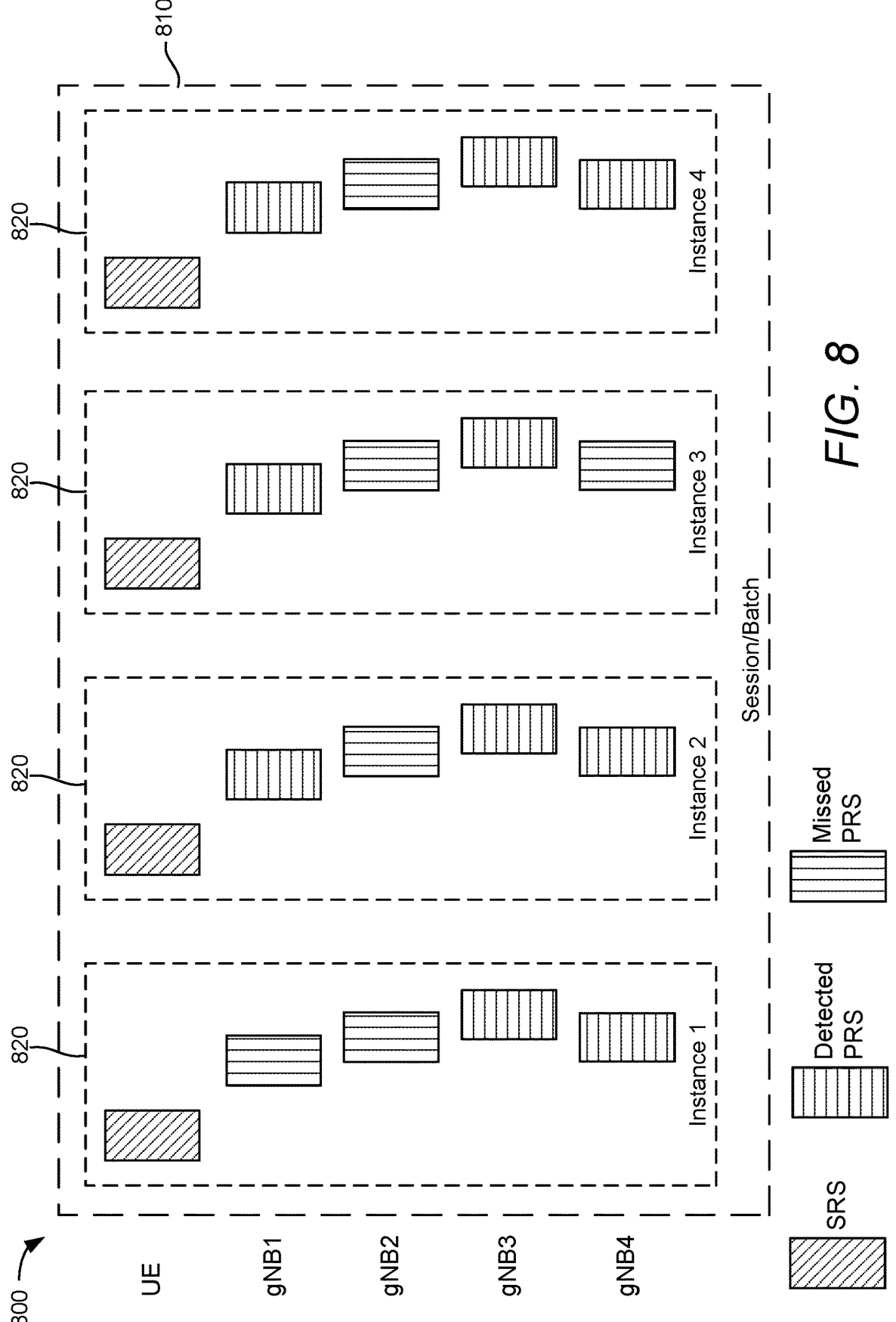
FIG. 8 is a diagram of an example of grouping positioning measurements into a batch from the perspective of a UE, according to aspects of the disclosure.

Generally, the positioning entity (e.g., the LMF) combines batches of SRS and PRS measurements across multiple time instances (or time windows) to calculate an estimate of a UE's location. FIG. 8 is a diagram 800 of an example of grouping positioning measurements into a batch from the perspective of a UE, according to aspects of the disclosure. FIG. 8 illustrates a single measurement batch 810, which may be some or all of the measurements taken during a positioning session. The measurement batch 810 may include measurements of PRS transmitted by 'N' base stations (e.g., gNBs). In the example of FIG. 8, there are four base stations, labeled "gNB1," "gNB2," "gNB3," and "gNB4." The measurement batch 810 may include 'M' measurement instances 820 during which the 'N' base stations transmitted and the UE measured, or attempted to measure, PRS. In the example of FIG. 8, there are four measurement instances 820, labeled "Instance 1," "Instance 2," "Instance 3," and "Instance 4."

Within each measurement instance 820, the top block represents the SRS transmitted by the UE in that measurement instance 820. The remaining four blocks represent the PRS resources transmitted by the involved base stations. The PRS blocks are shaded to indicate whether they were detected and measured by the UE or missed and not measured by the UE. The SRS transmitted in a given measurement instance 820 may or may not be measured by the 'N' base stations, as discussed below with reference to FIG. 9. The horizontal offsets between the illustrated blocks in the measurement instances 820 indicate that the PRS resources may not be transmitted at the exact same time.

As illustrated in FIG. 8, a measurement instance (e.g., a measurement instance 820) is a period of time during which both PRS and SRS can be transmitted and measured. For example, a measurement instance may include both a PRS occasion and an SRS occasion, one or more slots containing both PRS resources and SRS resources, or the like. A system frame, slot, etc. may include both PRS and SRS resources due to an overlap in the periodicity of the PRS and SRS occasions. A measurement instance may begin at the start of a system frame (identified by a system frame number (SFN))

including the overlapping PRS and SRS occasions or slots, or the slot at the beginning of the overlapping PRS and SRS occasions or slots.

A measurement instance may also be referred to as a "transmission instance," since the UE and the base station are measuring PRS or SRS transmitted in that same time period. Further, a "measurement instance" or a "transmission instance" may be referred to as a "measurement window" or a "transmission window," respectively, since an instance is some period of time. A measurement/transmission instance may also be referred to as a "time instance" or an "instance."

There are various reasons that the UE may measure certain PRS resources in a measurement instance 820 and not others. One reason is that in each measurement instance, the UE has the capability of measuring fewer PRS resources than the number of PRS resource with which it is configured. For example, the UE may perform positioning measurements in a round-robin manner across all measurement instances 820. Another reason is that the UE may not be able to detect the PRS in given measurement instance 820. Yet another reason is that different measurement instances 820 will have different sets of PRS measurements.

It would be beneficial for the LMF (or other positioning entity) to know which set of PRS resources were measured in which measurement instance 820. For example, the LMF would be able to build a Kalman filter based on the measurements of each UE-base station pair.

Figure 9:
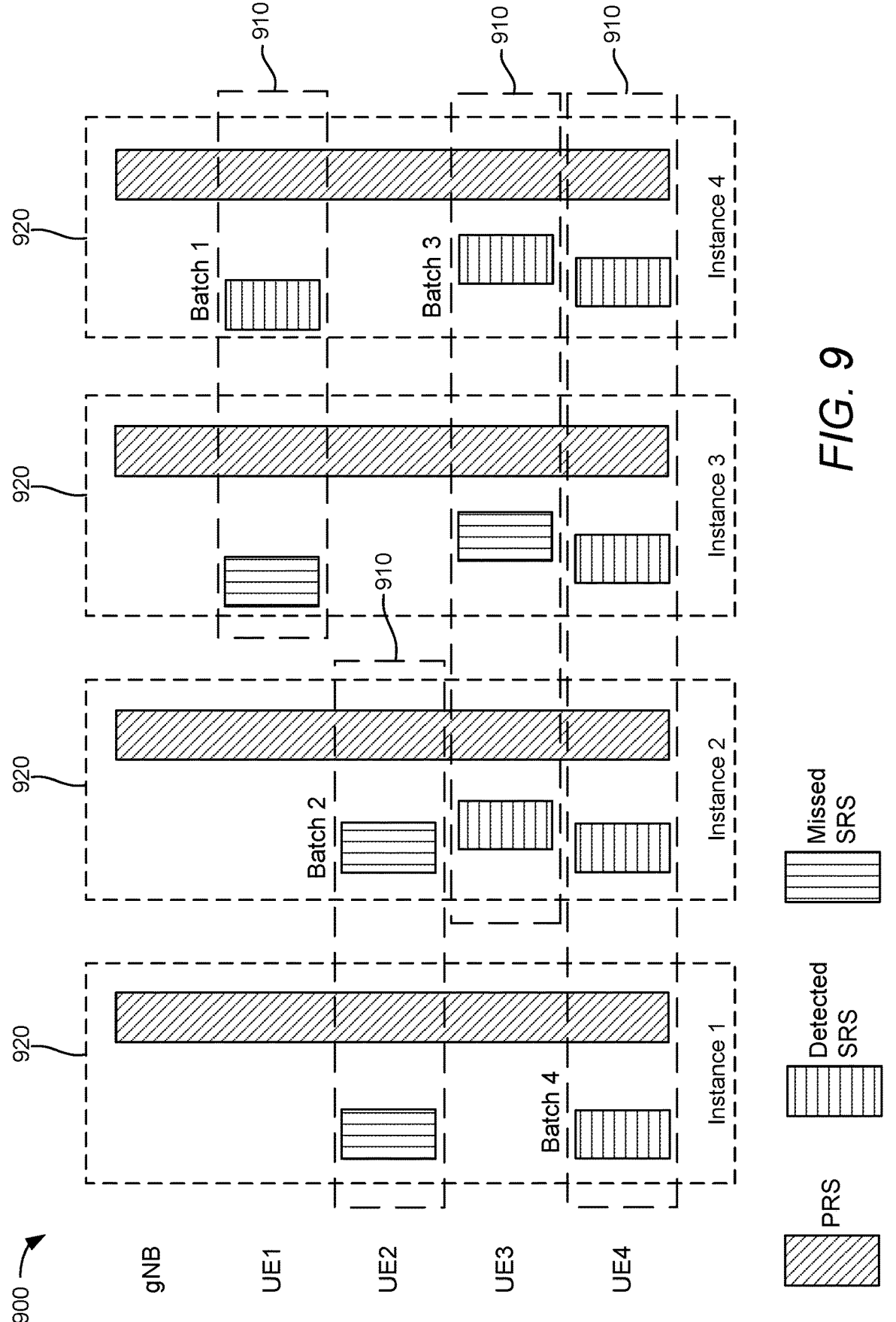
FIG. 9 is a diagram of an example of grouping positioning measurements into batches from the perspective of a base station, according to aspects of the disclosure.

FIG. 9 is a diagram 900 of an example of grouping positioning measurements into batches from the perspective of a base station, according to aspects of the disclosure. A base station may be involved in positioning sessions with 'N' different UEs. In the example of FIG. 9, there are four UEs, labeled "UE1," "UE2," "UE3," and "UE4." Because there are 'N' UEs, there are 'N' measurement batches 910, one for each positioning session with a respective UE. Thus, in the example of FIG. 9, there are four measurement batches 910, labeled "Batch 1," "Batch 2," "Batch 3," and "Batch 4." The different measurement batches 910 may span one or more measurement instances 920, up to 'M' measurement instances 920. In the example of FIG. 9, there are four measurement instances 920, labeled "Instance 1," "Instance 2," "Instance 3," and "Instance 4."

Within each measurement instance 920, the large block represents the PRS resource transmitted by the base station in that measurement instance 920. The small blocks represent the SRS transmitted by the respective UE in the measurement instance 920. The SRS blocks are shaded to indicate whether they were detected and measured by the base station or missed and not measured by the base station. The PRS resource transmitted in a given measurement instance 920 may or may not be measured by the 'N' UEs, as discussed above with reference to FIG. 8. The horizontal offsets between the illustrated blocks in the measurement instance 920 indicate that the SRS may not be transmitted at the exact same time.

FIG. 9 illustrates the measurement batches 910 of a single base station; however, there may be multiple base stations involved in a positioning session with the same UE. In that case, each base station may measure different sets of UEs in each measurement instance 920. It would be very beneficial for the LMF (or other positioning entity) to know which set of SRS were measured in which measurement instance 920. For example, the LMF could build a Kalman filter based on the measurements from each UE-base station pair.

Upon receiving the measurement batches illustrated in FIGS. 8 and 9, the LMF (or other positioning entity)

attempts to time align the measurements based on the timestamps of the measurements. That is, the LMF attempts to align the measurements in the time domain, ideally resulting in the measurements being arranged into the measurement instances in which they were performed, as illustrated in FIGS. 8 and 9. The LMF can then determine which PRS measurements (performed by the UE) match which SRS measurements (performed by the base stations).

It would be preferable for the LMF to have concurrent measurements from the UE and each base station in order to easily integrate/match the measurements. To do so, the base station and UE should preferably transmit the PRS and SRS during the same measurement instance. However, to accomplish this, the UE and the base station should be fairly close (physically) to each other. If the UE and the base station are not very close to each other, positioning performance will be limited.

Figure 10:
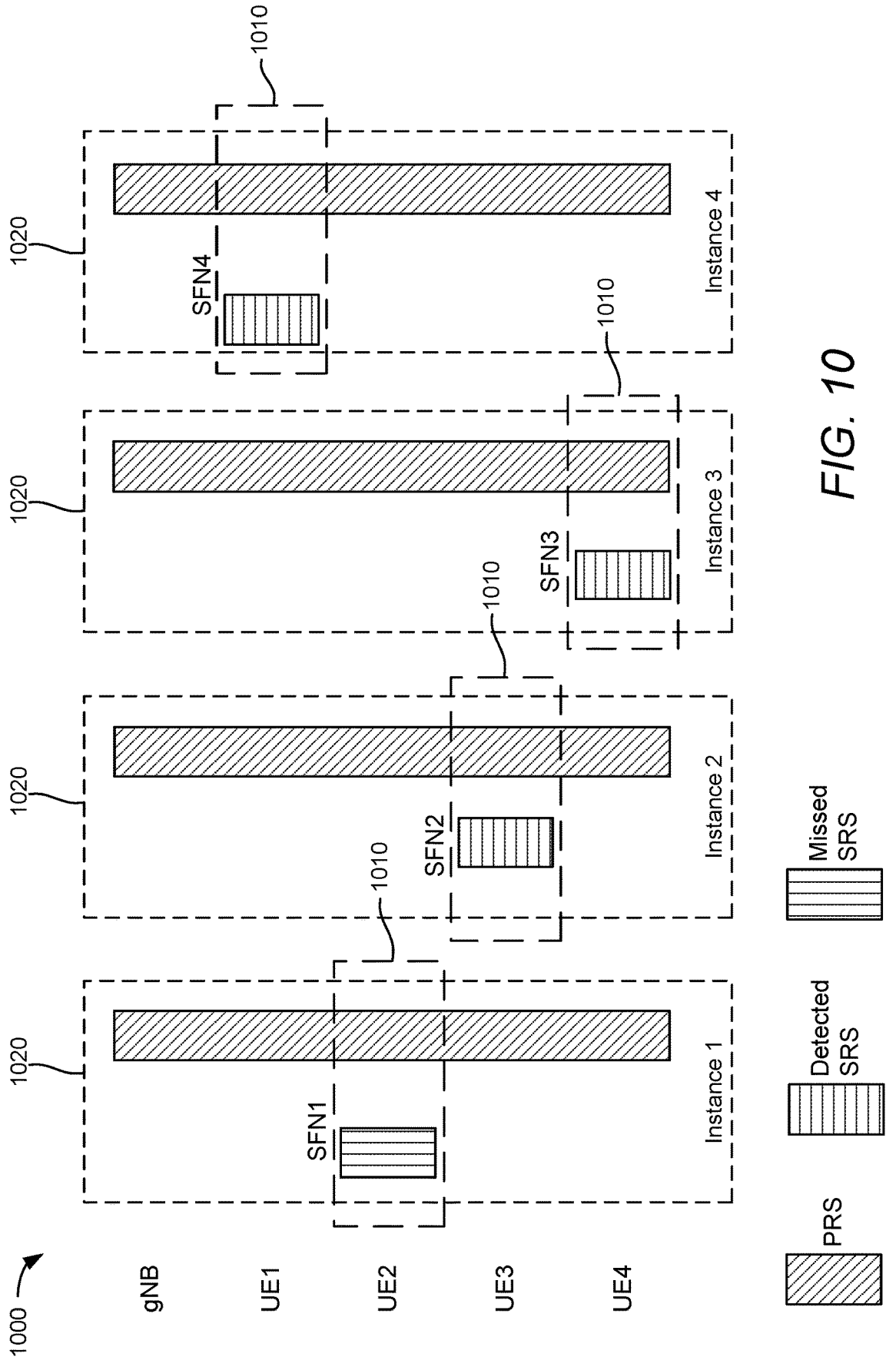
FIG. 10 is a diagram of an example of an ideal solution for grouping positioning measurements into batches from the perspective of a base station, according to aspects of the disclosure.

FIG. 10 is a diagram 1000 of an example of an ideal solution for grouping positioning measurements into batches from the perspective of a base station, according to aspects of the disclosure. As in FIG. 9, the base station may be involved in positioning sessions with 'N' different UEs. In the example of FIG. 10, there are four UEs, labeled "UE1," "UE2," "UE3," and "UE4." In addition, there may be up to 'M' measurement instances 1020. In the example of FIG. 10, there are four measurement instances 1020, labeled "Instance 1," "Instance 2," "Instance 3," and "Instance 4."

Unlike FIG. 9, where the measurement batches 910 span multiple measurement instances 920, in FIG. 10, the PRS and SRS measurements performed by the base station and each UE are concurrent within the same measurement instance 1020—there are therefore no batches of measurements for a single UE. As described above, a single measurement instance may correspond to or be some subset of a system frame. As such, FIG. 10 illustrates the concurrent measurements associated with each pair of the base station and a UE within a measurement instance 1020 as being identified by a target SFN 1010. That is, each target SFN 1010 identifies the measurement instance 1020 during which the base station and one of the four illustrated UEs is expected to transmit and measure PRS and SRS. Because there are 'N' UEs (four in the example of FIG. 10), there are 'N' target SFNs 1010, one for each pair of the base station and a respective UE. The target SFNs 1010 are labeled "SFN1," "SFN2," "SFN3," and "SFN4."

Within each measurement instance 1020, the large block represents the PRS resource transmitted by the base station in that measurement instance 1020. The small block represents the SRS transmitted by the respective UE in the measurement instance 1020. The SRS blocks are shaded to indicate whether they were detected and measured by the base station or missed and not measured by the base station. The different horizontal offsets of the SRS in the illustrated measurement instances 1020 indicate that the SRS may not be transmitted at the same time within a measurement instance 1020.

The present disclosure provides techniques for the LMF to indicate its preferred or suggested measurement instances (or transmission instances or measurement windows or transmission windows, etc.) to enable concurrent measurements from UE and base station pairs, as illustrated in FIG. 10. The preferred or suggested measurement instances may be referred to as, and treated as, "high priority" measurement instances, since they allow for concurrent measurements by a UE and base station pair. In an aspect, the LMF can include one or more preferred, or suggested, measurement instances in the MEASUREMENT REQUEST message (as at 710 of FIG. 7) transmitted to the neighboring base stations and/or in the "Requested SRS Transmission Characteristics" IE transmitted to the serving base station to enable a best-effort concurrent UE-base station measurement pair (e.g., the pairs of SRS and PRS resources in the measurement instances 1020). The LMF may indicate different preferred measurement instances for different base station-UE pairs, as illustrated by the different target SFNs 1010 illustrated in FIG. 10.

The techniques described below to enable concurrent measurements from UE and base station pairs may be used to enable higher accuracy positioning of a UE with multi-cell round trip time (RTT) positioning, also referred to as multi-RTT. With multi-RTT, a UE (e.g., UE 104) measures the time difference between a downlink signal (e.g., DL-PRS) received at the UE from a base station (e.g. a gNB) and either an uplink signal (e.g., UL SRS or a next or previous transmitted subframe) transmitted by the UE or uplink signal timing at the UE. This measurement is known as a UE Rx-Tx time difference measurement. Each base station, for which an Rx-Tx time difference measurement is obtained by the UE, also measures the time difference between an uplink signal (e.g. UL SRS) received from the UE and either a downlink signal (e.g. DL-PRS or a next or previous subframe) transmitted by the base station or downlink signal timing at the base station. This measurement is known as a BS Rx-Tx time difference measurement. The round trip signal propagation time between a UE and a base station (i.e., the RTT) can be obtained as the sum of the UE Rx-Tx time difference and the BS Rx-Tx time difference. A location of the UE can be obtained from RTTs obtained for three of more base stations using multi-lateration techniques. The accuracy of multi-RTT can be improved if the UE Rx-Tx and BS Rx-Tx time difference measurements are performed at the same time or nearly the same time, because RTT errors due to UE movement and timing drift in the UE or base station during a period of time between the two measurements would be minimized. However, the techniques can also be used to ensure that base stations (e.g. gNBs) make uplink measurements at the same time or almost the same time for uplink-based positioning methods, such as UL-TDOA or UL-AoA, which can reduce uplink measurement errors due to UE movement and timing drift in the UE or base station during a period of time between measurements between different pairs of base stations.

The techniques can further be used to schedule downlink positioning measurements by a UE and/or uplink positioning measurements by one or more base stations to occur at a given preferred or fixed time, which may be useful to enable an external client that receives the determined UE location to indicate the preferred or required time of measurement when sending a location request for the UE. More generally, the techniques can be used with any individual or combination of uplink-, downlink-, and uplink-and-downlink-based positioning methods to control the times when measurements are obtained and the times when uplink and/or downlink signals are transmitted to enable these measurements. It is further to be understood for the techniques described below that an LMF may correspond to another type of location server (e.g., an SLP) and that a base station may correspond to a gNB, ng-eNB, eNB, WiFi AP, or other type of base station.

In a first technique, an LMF may identify or otherwise indicate a preferred/suggested/high priority measurement instance using an SFN offset or an SFN-plus-slot offset. That is, the offset may indicate the SFN (SFN offset) or slot(s) within an SFN (SFN-plus-slot offset) within which the base station and/or the UE is expected to perform and report measurements of SRS or PRS, respectively. Thus, for example, with reference to FIG. the LMF may indicate SFN1 to the base station and/or the UE2 to cause the base station and/or the UE2 to measure and report the SRS and/or PRS, respectively, scheduled within the identified SFN (i.e., SFN1), that is, the SRS and/or PRS scheduled within the measurement instance 1020 labeled "Instance 1."

In an aspect, the LMF can include the preferred, or suggested, SFN offset or SFN-plus-slot offset in the MEA-SUREMENT REQUEST message transmitted to each base station involved in a positioning session with a UE. Each base station receiving a MEASUREMENT REQUEST message will attempt to perform and report measurements of SRS, Rx-Tx, etc. with respect to the preferred/suggested SFN or slot received for that base station. That is, the base station will attempt to measure the SRS transmitted in at least the specified SFN or slot identified by the received SFN or SFN-plus-slot offset. The serving base station can use the measurement periodicity (e.g., the "Measurement Periodicity" IE in the MEASUREMENT REQUEST message) and the SFN or SFN-plus-slot offset to determine the preferred SRS to be transmitted by the UE. The serving base station can then configure the UE accordingly. The neighboring base stations may use the measurement periodicity (e.g., the "Measurement Periodicity" IE in the MEASUREMENT REQUEST message) and the SFN or SFN-plus-slot offset to determine the preferred SRS to be measured.

Alternatively, or additionally, the LMF can include one or more preferred, or suggested, SFN offsets or SFN-plus-slot offsets in the MEASUREMENT REQUEST message transmitted to the UE being located. There may be a different SFN offset or SFN-plus-slot offset for each involved base station. In this case, the UE will attempt to measure and report measurements of PRS, Rx-Tx, RSTD, etc. with respect to the preferred/suggested SFN or slot for each involved base station.

In a second technique, an LMF may identify or otherwise indicate a measurement window in a MEASUREMENT REQUEST message transmitted to the neighboring base stations to enable a best-effort concurrent UE-base station measurement pair. The measurement window may identify a preferred/suggested/high priority measurement instance(s) to be used by the BSs for measurements of SRS from the UE. A measurement window may be configured using, for example, a start and/or end type of configuration, or a start plus number of slots (or measurement instances) type of configuration. In this technique, the LMF simply suggests a time-domain window, whereas in the first technique, the LMF suggests the actual system frames or slots to be used. Such a measurement window may also be referred to as the "response time" or "response window."

The first and/or second technique may also be used by an LMF to indicate to a UE when to perform downlink measurements of DL-PRS transmitted by base stations. For example, an LMF can send an LPP Request Location Information message to a UE and may indicate in the message (e.g., using SFNs or SFN offsets for the serving base station) a preferred time or times of measurement by the UE of DL-PRS or other signals transmitted by base stations and/or a preferred measurement window for these downlink measurements. The preferred times and/or time window can be the same as, or very close to, preferred times and time window indicated by the LMF to the base stations for uplink measurements, as described earlier, in order to synchronize location measurements by a UE and base stations to a common time.

As a third technique, an LMF may identify or otherwise indicate a transmission window in the "Requested SRS Transmission Characteristics" IE transmitted to a serving base station to identify the preferred/suggested/high priority transmission instances to be used by the UE for SRS transmissions. A transmission window may be configured using, for example, a start and/or end type of configuration, or a start plus number of slots (or measurement instances) type of configuration. Like the second technique, in this technique, the LMF simply suggests a time-domain window, whereas in the first technique, the LMF suggests the actual system frames or slots to be used.

In an aspect, an LMF may support any or all of the above techniques, and may choose which to implement in a particular positioning session or for a particular UE or a particular set of base stations.

As a fourth technique, a serving base station may use the suggested/preferred/high priority transmission/measurement window configuration to make certain determinations. First, the serving base station may determine whether or not to send timing advance (TA) corrections for the SRS that would affect the SRS timing inside the preferred windows. For example, the serving base station may instruct the UE to adjust its timing advance (the amount of time the UE's transmission timing leads, or precedes, the base station's reception timing) so that the SRS transmitted within preferred windows is more likely to be measured within the windows.

Second, the serving base station may determine whether or not to avoid scheduling other higher priority traffic and/or SRS (e.g., aperiodic or semi-persistent SRS) overlapped with the preferred SRS for measurement. Regarding SRS, the SRS to be measured during the preferred measurement/transmission window are periodic SRS, which are lower in priority than aperiodic or semi-persistent SRS.

Third, the serving base station may determine whether or not to send a request to the UE to feedback any autonomous TA corrections performed by the UE, or any timing adjustments related to the SRS transmitted performed by the UE during the preferred window. In this case, the serving base station may include a request for feedback of timing adjustments, together with a timing window during which the UE is to report only the relevant timing adjustments.

As a fifth technique, an LMF may send, directly to the UE, a request for the UE to report timing adjustments performed by the UE back to the network (e.g., the LMF or the serving base station). The request may include the preferred/suggested/high priority measurement window, during which the UE will report timing adjustments, which may have been sent to the neighboring base stations to enable them to perform measurements of the SRS transmitted during the preferred window. In other words, when an LMF requests specific SRS to be measured by BSs, it may also request the UE to send back any timing adjustments that are related to those specific SRS (but not all the SRS being transmitted). The timing adjustments may be related to a timing advance (TA) maintained by a UE to ensure uplink transmission from the UE has a fixed time difference to downlink transmission time at the serving base station as received at the UE. The TA may be determined by a serving base station and provided to the UE to ensure that uplink transmission from the UE arrive at the serving base station with timing (as seen by the serving base station) that corresponds to, or has known fixed difference to, the transmission timing at the serving base station. The UE may periodically (e.g., autonomously) adjust its transmission timing (e.g., a UE clock) to maintain the TA—e.g., when clock timing errors in the UE cause UE transmission timing to drift relative to the transmission timing received at the UE from the serving base station. The UE can indicate the amount of timing adjustment (e.g., in nanoseconds or units of NR subframe timing) and the time relative to either the UE transmission timing or received base station transmission time (e.g., using an SFN offset) when the adjustment occurred. The UE can provide a list of one or more such adjustments (e.g., as a list of pairs of values) to an LMF or to the serving base station. The UE may in some instances provide these adjustments to an LMF or base station when transmitting UL SRS to be measured by base stations even when not instructed by the LMF or base station.

In a variant of the fifth technique, a UE may indicate the measured or estimated TA during a period of transmission of UL SRS. For example, a UE may use a phase lock loop or some other feedback mechanism to maintain its internal clock and transmission timing aligned with the clock of a serving base station as seen by the UE in the timing of signals received from the serving base station. The alignment may attempt to maintain a certain TA difference between these timing sources. However, changes in UE to serving base station distance (caused by movement of the UE) and different amounts of timing drift in the UE versus serving base station clocks may cause the TA to change by a small amount and for the UE to adjust its timing to restore the TA to its intended value (e.g., as provided to the UE by the serving base station). In addition, the serving base station may indicate one or more changes of the TA to the UE during a period of UL SRS transmission by the UE. Accordingly, a UE could provide the value of the TA and/or changes to the value of the TA (and the times for which these TA values or TA changes occurred or were estimated or observed) during a measurement window to an LMF. These values can indicate to an LMF changes in UL SRS timing at the UE relative to the transmission timing of the serving base station as seen by the UE and may be used to determine the times (e.g., times relative to serving base station timing or absolute time) of transmission of UL SRS by the UE, which may be used to adjust and correct values of the UE Rx-Tx time difference measurements provided by a UE for multi-RTT and/or to adjust time measurement by base stations which measure a time of arrival, Rx-Tx time difference, or AoA for different UL SRS signals transmitted by the UE.

The above techniques are also applicable to sidelink communication. For example, for the aspects involving neighboring base stations, one or more of the neighboring base stations may instead be sidelink UEs with which the UE does not have an active communication connection. In such a scenario, the SRS transmitted towards the neighboring base stations would instead be sidelink PRS (SL-PRS), and the PRS received from the neighboring base stations would instead be SL-PRS. In some cases, the techniques described herein may also be applicable to sidelink UEs with which the UE does have an active communication connection, such as a relay UE.

FIG. 11 illustrates an example method 1100 of communication, according to aspects of the disclosure. In an aspect, the method 1100 may be performed by a location server, such as an LMF 270.

At 1110, the location server transmits, to the first network node, a first set of parameters indicating time and frequency information related to transmission of periodic positioning reference signals by a second network node. In an aspect, operation 1110 may be performed by the one or more network transceivers 390, the one or more processors 394, memory 396, and/or positioning component 398, any or all of which may be considered means for performing this operation.

At 1120, the location server transmits a first request to at least the first network node, the first request including at least a second set of parameters indicating one or more first time instances of the plurality of periodic time instances during which the first network node is expected to perform and report one or more first positioning measurements. In an aspect, operation 1120 may be performed by the one or more network transceivers 390, the one or more processors 394, memory 396, and/or positioning component 398, any or all of which may be considered means for performing this operation.

At 1130, the location server receives a first measurement report from the first network node, the first measurement report including the one or more first positioning measurements of the periodic positioning reference signals transmitted by the second network node during the one or more first time instances. In an aspect, operation 1130 may be performed by the one or more network transceivers 390, the one or more processors 394, memory 396, and/or positioning component 398, any or all of which may be considered means for performing this operation.

FIG. 12 is an example method 1200 of communication, according to aspects of the disclosure. In an aspect, the method 1200 may be performed by a location server, such as an LMF 270.

At 1210, the location server transmits, to a first network node, a first set of parameters indicating a time-domain periodicity and frequency allocation for transmission of periodic positioning reference signals by a second network node. In an aspect, operation 1210 may be performed by the one or more network transceivers 390, the one or more processors 394, memory 396, and/or positioning component 398, any or all of which may be considered means for performing this operation.

At 1220, the location server transmits a first request to at least the first network node, the first request including at least a second set of parameters indicating at least one or more first time instances of the plurality of periodic time instances during which the first network node is requested to configure the second node to transmit the periodic positioning reference signals. In an aspect, operation 1220 may be performed by the one or more network transceivers 390, the one or more processors 394, memory 396, and/or positioning component 398, any or all of which may be considered means for performing this operation.

FIG. 13 is an example method 1300 of communication, according to aspects of the disclosure. In an aspect, the method 1300 may be performed by a base station (e.g., any of the base stations described herein).

At 1310, the base station receives a request from a location server (e.g., LMF 270), the request including at least a set of parameters indicating one or more time instances (e.g., measurement instances 1020) during which a UE (e.g., any of the UEs described herein) is expected to transmit periodic SRS. In an aspect, operation 1310 may be performed by the one or more WWAN transceivers 350, the one or more short-range wireless transceivers 360, the one or more network transceivers 380, the one or more processors 384, memory 386, and/or positioning component 388, any or all of which may be considered means for performing this operation.

At 1320, the base station configures the UE to transmit the periodic SRS at least during the one or more time instances. In an aspect, operation 1320 may be performed by the one

41

42 or more WWAN transceivers 350, the one or more short-range wireless transceivers 360, the one or more network transceivers 380, the one or more processors 384, memory 386, and/or positioning component 388, any or all of which may be considered means for performing this operation.

At 1330, the base station determines whether to transmit, to the UE, a TA update related to the periodic SRS within the one or more time instances, whether to avoid scheduling higher priority traffic during the one or more time instances, whether to request the UE to feedback to the base station any autonomous timing adjustments associated with the one or more time instances, or any combination thereof. In an aspect, operation 1330 may be performed by the one or more WWAN transceivers 350, the one or more short-range wireless transceivers 360, the one or more network transceivers 380, the one or more processors 384, memory 386, and/or positioning component 388, any or all of which may be considered means for performing this operation.

FIG. 14 is an example method 1400 of wireless communication, according to aspects of the disclosure. In an aspect, the method 1400 may be performed by UE (e.g., any of the UEs described herein).

At 1410, the UE receives a request from a location server (e.g., LMF 270), the request including a configuration for the UE to report any timing adjustments associated with one or more time instances during which the UE is configured to transmit periodic SRS. In an aspect, operation 1410 may be performed by the one or more WWAN transceivers 310, the one or more processors 332, memory 340, and/or positioning component 342, any or all of which may be considered means for performing this operation.

At 1420, the UE performs a timing adjustment of the periodic SRS during at least one of the one or more time instances. In an aspect, operation 1420 may be performed by the one or more WWAN transceivers 310, the one or more processors 332, memory 340, and/or positioning component 342, any or all of which may be considered means for performing this operation.

At 1430, the UE transmits an indication of the timing adjustment to the location server. In an aspect, operation 1430 may be performed by the one or more WWAN transceivers 310, the one or more processors 332, memory 340, and/or positioning component 342, any or all of which may be considered means for performing this operation.

As will be appreciated, a technical advantage of the methods 1100 to 1400 is improved positioning performance due to enabling measurement alignment between the UE and the involved base stations.

The following provides additional aspects related to the above disclosure.

Time Delay Group Delay

Three level of time delays that may need to be taken into account: Constant knowns adjustments (e.g., the group delay differences are assumed to be more constant across different beams), periodically updates known adjustments, and statistical parametrization of the adjustments (e.g. where a drift rate may be useful).

There may be an option of sending timing error adjustments to the LMF or the UE (for UE-Based positioning). For UE-based UL/DL-TDOA, this would correspond to round-trip delay (RTD) per PRS resource.

With regards to having to send time-drift (or some other modelling), to enable extrapolation of the time delays, rather than sending periodic adjustment packages: gNBs may not be correcting the frequency offsets simultaneously; so the RTD may not just be a linear function.

The base station frequency and baseband clock should be fully tied. It may not be able to perform the jumps that the UE is performing in the uplink. The clock that is used to derive the RF may be the same clock that is used to derive the baseband.

Group Delay Calibration

In an aspect, the current agreement on measurement gap enhancements, which can be used for other purposes (e.g., power amplifier (PA) calibration, maximum permissible exposure (MPE)), can be reused. Currently, the UE may be allowed to transmit RF signals inside the calibration gap. There is an expression: "Other self-calibration and monitoring are not precluded." However, for FR1, there is no such related procedure.

Group Delay Estimation may need to be performed with larger transmit power (different power level) compared to the case of MPE if indeed the group delay changes with different power levels.

The need for over-the-air (OTA) group delay calibration in mission mode is being discussed. If the group delay is sensitive to different transmit power levels, there may be a need to introduce or reuse gaps in the spec for group delay calibration.

In the LPP and NRPPa standards, timestamps for uplink and downlink measurements are already present, as is information on gNB SFN timing (with 0.23-nanosecond precision). What could then be added to improve accuracy for multi RTT and/or DL-TDOA would be:

1. Recent TA history at the UE (e.g., a series of SFN numbers for the serving base station plus TA (delta) where there was a change of TA or where a difference in TA was observed by the UE without an adjustment by the UE).
2. Recent RTD history between pairs of base stations in terms of deltas or drift rates—useful if broadcasted and received by a UE just prior to location computation for UE-based DL-TDOA.
3. Group delay ID at the UE.
4. Whether the UE compensates for UE group delay.
5. Pre-calibrated UE group delay (if available).

The group delay at the base station may already be implied by the PRS resource and PRS resource set IDs.

The following provides additional aspects related to the above disclosure.

LPP has a concept of QoS, but NRPPa appears to be missing it. It would be useful to have QoS for NRPPa too, because it would clarify how a base station could report measurements from multiple instances for the same UE. This would be useful for multi-RTT efforts where multiple measurements from the UE and base stations are reported per session.

The "multiple measurement reporting per session/report" may be included in future versions of NR. Different variations of such an enhancement may be part of the specification on timing error mitigation and part of the UL-AoA enhancements. For example, the LPP QoS information element (IE) 1500 illustrated in FIG. 15 may be enhanced:

In an aspect, the QoS IE 1500 could clarify how the base station could report measurements from multiple instances. For example, additional fields could be added.

In an aspect, this information (i.e., multiple measurement reporting per session/report) could be added as a new part of the measurement-report IE rather than the QoS IE 1500.

In an aspect, "ResponseTime" can be used as a time budget during which a UE or base station can make measurements. As such, QoS belongs with the assistance data from the LMF to the UE/base station. The horizontal and vertical accuracies are just targets. Measurement reports come with uncertainties.

Note that for OTDOA, "ResponseTime" is not used as a time budget/timer. Rather, some back-off is provided to account for latency. Measurements are made over the corresponding period of time after reception, and measurements are reported only at the end of the time period.

A QoS/response time is not currently supported in LPPa. It is not supported for GSM UL-TDOA either.

In an aspect, there may be no need for uplink-based positioning, since the base station can report measurements "when available" and/or configured via operations and management (O&M) (in particular, since there were no base station measurement requirements, a "response time" may imply some requirements on the base station measurement delay, similar to UE requirements). However, for multi-RTT, a "response time" seems sensible, since the uplink measurement period should be somewhat aligned with the downlink measurement period. The LMF may need to use periodic NRPPa reporting with the desired interval as "response time."

In an aspect, with regards to uplink, given the aspect of UE reporting uplink TA corrections/adjustments, it may make sense for the LMF (or serving base station) to inform the UE for which period of time the UE should send any adjustments, if needed. This would mean that the UE would effectively know implicitly a "measurement period" time of the base stations. It may be inefficient for the UE to be sending out all TA adjustments. On the other hand, another solution could be that the UE sends TA adjustments report whenever an SRS-for-positioning is configured, under the assumption, that if SRS-for-positioning is configured, something is measuring.

However, for regular SRS, which is supposed to be transparent, the UE cannot be asked to start sending TA adjustments all the time. So, the UE should get a time period, which should be the same as a "measurement period" configured to the base stations. As such, it may be useful to have also for uplink-based positioning a concept of "measurement period" or "response time." Also, since there is on-demand positioning where the request is coming from the LMF, it may make sense for the LMF to send a request and a response time with it.

In an aspect, the "response time" may not need to be directly coupled with the periodicity of the PRS/SRS or with the alignment between downlink and uplink. As long as all measurements are time-stamped, then the LMF can put together the "matching" base station-side and UE-side measurements. The point is to be able to report multiple such measurements in a single report, which should be possible if each is timestamped. There could be different ways of timestamping in a bundled report, e.g., explicit timestamp with GPS-time or with SFN/slot, etc. for each measurement, or do that only for the first one and the rest are inferred from the PRS/SRS periodicity.

In as aspect, the UE's TA adjustment reporting could be decoupled from the aspect of the previous paragraph. Instead, in a separate report (or together with other measurements), the UE lists its history of timing corrections. There will still be a need for some idea of the response time even with all these timestamps because the LMF must know how long to wait to receive these updates before it begins the position-calculation.

Regarding the UE's TA adjustment reporting being decoupled, there should be a reason for the UE to add all the timing corrections. It could be assumed that the UE is requested specific timing corrections for a specific period of time. Especially for the transparent UL-TDOA/AoA method, it could be assumed that a message would be specified in LPP (or RRC through base station) that asks the UE to add if there are any timing corrections (timestamp plus correction value) within a period of time.

Thus, in an aspect, "all relevant timing corrections" may be reported. There may be additional details around what is considered "relevant"—it could be decided implicitly based on configured periodicities and occasions of PRS/SRS, or explicit based on request from LMF. In case of a request from the LMF, the timestamping could be based on some parameter of the request (when the request is received, and/or a timestamp field within the request that specifies the desired period of time).

For multi-RTT, uplink and downlink transmissions and measurements should be as concurrent as possible in order to minimize impact from clock drift and UE motion. The following may be impediments to this in 3GPP:

1. No UL-SRS for positioning transmission during measurement gaps. SRS-for-positioning is limited to leading DL-PRS for best performance.
2. No target start time. The UE and base station may get assistance data (AD) at different times and start measurements at different instances. If the base station performs single-shot measurement, and with larger latency for AD to UE than to base station, the base station is likely to make its measurement before the first UE instance.
3. No response time/measurement duration for NRPPa. This should alleviate latency imbalance by ensuring both sides make multiple measurements.

With regards to the first point in the preceding section, it may be necessary to enable PRS without measurement gaps and ensure the UE can drop other processing/channels. Transmission of SRS during measurement gaps is a bigger change and may not be permissible, or it may be better to do it that way.

In an aspect, a set of changes to support the above features may include the following:

1. Overall aim: synchronize uplink and downlink measurements and preconfigured measurement gaps.
2. Extend the NRPPa Positioning Information Request (for SRS) with time information on DL-PRS occurrences.
3. Base station configures SRS to not collide with DL-PRS and provides measurement gaps for DL-PRS measurement.
4. Extend the NRPPa Positioning Information Response with information on whether measurement gaps for DL-PRS measurement will be assigned.
5. Extend the NRPPa Positioning Activation Request (for SRS) with a time T1-T2 range for SRS transmission and DL-PRS measurement (which can limit the extent of SRS transmission and measurement gaps)
6. Extend the LPP Request Location Information to indicate the T1-T2 range and a preferred time T for the DL-PRS measurements. Also indicate whether the base station provides measurement gaps.
7. Extend the NRPPa Measurement Request with the preferred time T and time T1-T2 range for SRS measurements.
8. For uplink-only and downlink-only positioning methods, a subset of the above can be used except that preconfiguration of measurement gaps for downlink positioning is probably not needed as it may not reduce latency.

The above aspects impact LPP and NRPPa but not RRC or MAC. It is also optional for a base station. The latency aspect may be applicable to the downlink parts for DL-AoD. Also, the preferred time T (for measurement synchronization) was previously proposed.

In an aspect, new periodicity options may be added for periodic reporting. Currently, only 640 ms option is aligned with DL-PRS and SRS periodicities. Both for single-shot and periodic reporting, it may be beneficial to add explicit options for batch-reporting, i.e., report measurements of the same resources from multiple instances.

For Release 16 of the 3GPP NR standard, the LMF may have some (implicit) control of the base station response time (for single reports, a.k.a. "on-demand"), however, the measuring base station's would not know this in advance.

In an aspect, for periodic SRS, the LMF may request a certain number of periodic transmissions together with the periodicity. This defines the amount of SRS a base station has available for measurements and therefore, the time when the LMF can expect to receive the measurement results (at the latest). For semi-persistent, the LMF may send activation and deactivation requests, which can also define the base station response time for measurements. In any case, the base station would not know in advance for how long to measure, and the base station would need to "detect" when the SRS transmission has ended. But in this way, the LMF can have at least some control over base station measurement duration.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of communication performed by a location server, comprising: transmitting, to a first network node, a first set of parameters indicating time and frequency information related to transmission of periodic positioning reference signals by a second network node; transmitting a first request to at least the first network node, the first request including at least a second set of parameters indicating one or more first time instances of the plurality of periodic time instances during which the first network node is expected to perform and report one or more first positioning measurements; and receiving a first measurement report from the first network node, the first measurement report including the one or more first positioning measurements of the periodic positioning reference signals transmitted by the second network node during the one or more first time instances.

Clause 2. The method of clause 1, wherein: the second set of parameters comprises a system frame number (SFN) offset or an SFN-plus-slot offset, the one or more first time instances comprise one or more system frames or one or more slots, and the SFN offset identifies the one or more system frames or the SFN-plus-slot offset identifies the one or more slots.

Clause 3. The method of clause 2, further comprising: transmitting a measurement periodicity parameter and an offset parameter to the first network node.

Clause 4. The method of clause 3, wherein: the second network node is a UE, the first network node is a neighboring base station of the UE or a sidelink UE with which the UE does not have an active communication connection, the location server transmits the measurement periodicity parameter and the offset parameter to the neighboring base station or the sidelink UE to enable the neighboring base station or the sidelink UE to measure the periodic positioning reference signals transmitted by the UE during the one or more first time instances, and the periodic positioning reference signals are periodic sounding reference signals (SRS) or sidelink positioning reference signals (SL-PRS).

Clause 5. The method of clause 3, wherein: the first network node is a UE, the second network node is a base station or a sidelink UE with which the UE has an active communication connection, the location server transmits the measurement periodicity parameter and the offset parameter to the UE to enable the UE to measure the periodic positioning reference signals transmitted by the base station or the sidelink UE during the one or more first time instances, and the periodic positioning reference signals are periodic New Radio (NR) or Long-Term Evolution (LTE) positioning reference signals (PRS) or SL-PRS.

Clause 6. The method of any of clauses 1 to 3, wherein: the second network node is a UE, the first network node is a neighboring base station of the UE or a sidelink UE with which the UE does not have an active communication connection, and the second set of parameters specify a measurement window that includes at least the one or more first time instances.

Clause 7. The method of clause 6, wherein the second set of parameters comprise a start of the measurement window and an end of the measurement window.

Clause 8. The method of any of clauses 6 to 7, wherein the second set of parameters comprise a start of the measurement window and a length of the measurement window.

Clause 9. The method of any of clauses 6 to 8, wherein the first request is a MEASUREMENT REQUEST message of a measurement procedure between the location server and the neighboring base station.

Clause 10. The method of any of clauses 1 to 9, wherein the one or more first positioning measurements comprise one or more time of arrival (ToA) measurements, one or more reference signal time difference (RSTD) measurements, one or more reception-to-transmission (Rx-Tx) time difference measurements, reference signal received power (RSRP) measurements, received signal strength indicator (RSSI) measurements, angle-based measurements, or any combination thereof Clause 11. The method of any of clauses 1 to 10, further comprising: transmitting, to a third network node, the first set of parameters indicating time and frequency information related to transmission of the periodic positioning reference signals by the second network node; transmitting a second request to the third network node, the second request including at least a third set of parameters indicating one or more second time instances of the plurality of periodic time instances during which the third network node is expected to perform and report one or more second positioning measurements; and receiving a second measurement report from the third network node, the second measurement report including the one or more second positioning measurements.

Clause 12. The method of clause 11, wherein: the second network node is a UE, the first network node is a first base station involved in a positioning session with the UE, and the third network node is a second base station involved in the positioning session with the UE.

Clause 13. The method of clause 11, wherein: the second network node is a base station, the first network node is a first UE involved in a positioning session with the base station, and the third network node is a second UE involved in a positioning session with the base station.

Clause 14. The method of any of clauses 11 to 13, wherein: the one or more second time instances are different than the one or more first time instances.

Clause 15. The method of any of clauses 1 to 14, further comprising: calculating an estimate of a location of the second network node.

Clause 16. A method of communication performed by a location server, comprising: transmitting, to a first network node, a first set of parameters indicating a time-domain periodicity and frequency allocation for transmission of periodic positioning reference signals by a second network node; and transmitting a first request to the first network node, the first request including at least a second set of parameters indicating at least one or more first time instances of the plurality of periodic time instances during which the first network node is requested to configure the second node to transmit the periodic positioning reference signals.

Clause 17. The method of clause 16, wherein: the second set of parameters comprises a system frame number (SFN) offset or an SFN-plus-slot offset, the one or more first time instances comprise one or more system frames or one or more slots, and the SFN offset identifies the one or more system frames or the SFN-plus-slot offset identifies the one or more slots.

Clause 18. The method of any of clauses 16 to 17, wherein the second set of parameters indicating at least the one or more first time instances of the plurality of periodic time instances comprises at least a time-domain offset parameter.

Clause 19. The method of clause 18, wherein: the second network node is a user equipment (UE), the first network node is a serving base station of the UE, the location server transmits the time-domain periodicity parameter and the time-domain offset parameter to the serving base station to request the serving base station to configure the UE to transmit the periodic positioning reference signals at least during the one or more first time instances, and the periodic positioning reference signals are periodic sounding reference signals (SRS).

Clause 20. The method of clause 18, wherein: the first network node is a UE, the second network node is a base station or a sidelink UE with which the UE has an active communication connection, the location server transmits the time-domain periodicity parameter and the time-domain offset parameter to the UE to enable the UE to measure the periodic positioning reference signals transmitted by the base station or the sidelink UE during the one or more first time instances, and the periodic positioning reference signals are periodic New Radio (NR) or Long-Term Evolution (LTE) positioning reference signals (PRS) or sidelink PRS (SL-PRS).

Clause 21. The method of any of clauses 16 to 18, wherein: the second network node is a UE, the first network node is a serving base station of the UE, the second set of parameters specify a transmission window that includes the one or more first time instances, and the serving base station is expected to configure the UE to transmit the periodic positioning reference signals at least during the one or more first time instances based on the transmission window.

Clause 22. The method of clause 21, wherein the second set of parameters comprise a start of the transmission window and an end of the transmission window.

Clause 23. The method of any of clauses 21 to 22, wherein the second set of parameters comprise a start of the transmission window and a length of the transmission window.

Clause 24. The method of any of clauses 21 to 23, wherein the first request is a Requested SRS Transmission Characteristics information element (IE) of a POSITIONING INFORMATION REQUEST message of a positioning information exchange procedure between the location server and the serving base station.

Clause 25. The method of any of clauses 16 to 24, wherein the one or more first positioning measurements comprise one or more time of arrival (ToA) measurements, one or more reference signal time difference (RSTD) measurements, one or more reception-to-transmission (Rx-Tx) time difference measurements, reference signal received power (RSRP) measurements, received signal strength indicator (RSSI) measurements, angle-based measurements, or any combination thereof Clause 26. The method of any of clauses 16 to 25, further comprising: calculating an estimate of a location of the second network node.

Clause 27. A method of communication performed by a serving base station, comprising: receiving a request from a location server, the request including at least a set of parameters indicating one or more time instances during which a user equipment (UE) is expected to transmit periodic sounding reference signals (SRS); configuring the UE to transmit the periodic SRS at least during the one or more time instances; and determining whether to transmit, to the UE, a timing adjust (TA) update related to the periodic SRS within the one or more time instances, whether to avoid scheduling higher priority traffic during the one or more time instances, whether to request the UE to feedback to the base station any autonomous timing adjustments associated with the one or more time instances, or any combination thereof Clause 28. The method of clause 27, wherein the higher priority traffic includes aperiodic SRS, semi-persistent SRS, or both.

US 12,672,091 B2

49

Clause 29. The method of any of clauses 27 to 28, wherein the autonomous timing adjustments comprise an autonomous TA update or other transmission timing adjustment.

Clause 30. The method of any of clauses 27 to 29, further comprising: transmitting the TA update to the UE.

Clause 31. The method of any of clauses 27 to 30, further comprising: refraining from scheduling higher priority traffic during the one or more time instances.

Clause 32. The method of any of clauses 27 to 31, further comprising: transmitting a request to the UE to feedback to the base station any autonomous timing adjustments associated with the one or more time instances.

Clause 33. The method of clause 32, further comprising: transmitting a timing window to the UE, the timing window indicating a time period during which the UE is expected to report autonomous timing adjustments.

Clause 34. A method of communication performed by a user equipment (UE), comprising: receiving a request from a location server, the request including a set of parameters indicating one or more time instances during which one or more base stations are expected to measure periodic sounding reference signals (SRS) transmitted by the UE, the request further including a configuration for the UE to report any timing adjustments associated with the one or more time instances; performing a timing adjustment of the periodic SRS during at least one of the one or more time instances; and transmitting an indication of the timing adjustment to the location server.

Clause 35. A computer-readable medium storing computer-executable instructions, the computer-executable instructions comprising at least one instruction for causing an apparatus to perform a method in accordance with any of claims 1 to 34.

Clause 36. An apparatus comprising a memory, at least one transceiver, and at least one processor communicatively coupled to the memory and the at least one transceiver, the memory, the at least one transceiver, and the at least one processor configured to perform a method according to any of clauses 1 to 35.

Clause 37. An apparatus comprising means for performing a method according to any of clauses 1 to 35.

Clause 38. A non-transitory computer-readable medium storing computer-executable instructions, the computer-executable comprising at least one instruction for causing a computer or processor to perform a method according to any of clauses 1 to 35.

Additional implementation examples are described in the following numbered clauses:

Clause 1. A method of communication performed by a location server, comprising: transmitting, to a first network node, a first set of parameters indicating time and frequency information related to transmission of periodic positioning reference signals by a second network node; transmitting a first request to at least the first network node, the first request including at least a second set of parameters indicating one or more first time instances of a plurality of periodic time instances during which the first network node is expected to perform and report one or more first positioning measurements; and receiving a first measurement report from the first network node, the first measurement report including the one or more first positioning measurements of the periodic positioning reference signals transmitted by the second network node during the one or more first time instances.

50

Clause 2. The method of clause 1, wherein: the second set of parameters comprises a system frame number (SFN) offset or an SFN-plus-slot offset, the one or more first time instances comprise one or more system frames or one or more slots, and the SFN offset identifies the one or more system frames or the SFN-plus-slot offset identifies the one or more slots.

Clause 3. The method of any of clauses 1 to 2, wherein the second set of parameters comprises a measurement periodicity parameter and an offset parameter.

Clause 4. The method of any of clauses 1 to 3, wherein: the second network node is a user equipment (UE), the first network node is a base station or a sidelink UE, and the periodic positioning reference signals are periodic sounding reference signals (SRS) or sidelink positioning reference signals (SL-PRS).

Clause 5. The method of clause 4, wherein the UE does not have an active communication connection to the base station or the sidelink UE.

Clause 6. The method of any of clauses 1 to 3, wherein: the first network node is a UE, the second network node is a base station or a sidelink UE, and the periodic positioning reference signals are periodic New Radio (NR) or Long-Term Evolution (LTE) positioning reference signals (PRS) or SL-PRS.

Clause 7. The method of clause 6, wherein the UE has an active communication connection with the base station or the sidelink UE.

Clause 8. The method of any of clauses 1 to 7, wherein: the second network node is a UE, the first network node is a neighboring base station of the UE or a sidelink UE with which the UE does not have an active communication connection, and the second set of parameters specify a measurement window that includes at least the one or more first time instances.

Clause 9. The method of clause 8, wherein the second set of parameters comprise a start of the measurement window and an end of the measurement window.

Clause 10. The method of any of clauses 8 to 9, wherein the second set of parameters comprise a start of the measurement window and a length of the measurement window.

Clause 11. The method of any of clauses 6 to 10, wherein the first request is a MEASUREMENT REQUEST message of a measurement procedure between the location server and the base station.

Clause 12. The method of any of clauses 1 to 11, wherein the one or more first positioning measurements comprise one or more time of arrival (ToA) measurements, one or more reference signal time difference (RSTD) measurements, one or more reception-to-transmission (Rx-Tx) time difference measurements, reference signal received power (RSRP) measurements, received signal strength indicator (RSSI) measurements, angle-based measurements, or any combination thereof.

Clause 13. The method of any of clauses 1 to 12, further comprising: transmitting, to a third network node, the first set of parameters indicating time and frequency information related to transmission of the periodic positioning reference signals by the second network node; transmitting a second request to the third network node, the second request including at least a third set of parameters indicating one or more second time instances of the plurality of periodic time instances during which the third network node is expected to perform and report one or more second positioning measurements; and receiving a second measurement report from the third network node, the second measurement report including the one or more second positioning measurements.

Clause 14. The method of clause 13, wherein: the second network node is a UE, the first network node is a first base station involved in a positioning session with the UE, and the third network node is a second base station involved in the positioning session with the UE.

Clause 15. The method of clause 13, wherein: the second network node is a base station, the first network node is a first UE involved in a positioning session with the base station, and the third network node is a second UE involved in a positioning session with the base station.

Clause 16. The method of any of clauses 13 to 15, wherein: the one or more second time instances are different than the one or more first time instances.

Clause 17. The method of any of clauses 1 to 16, further comprising: calculating an estimate of a location of the second network node.

Clause 18. A method of communication performed by a location server, comprising: transmitting, to a first network node, a first set of parameters indicating a time-domain periodicity and frequency allocation for transmission of periodic positioning reference signals by a second network node; and transmitting a first request to the first network node, the first request including at least a second set of parameters indicating at least one or more first time instances of a plurality of periodic time instances during which the first network node is requested to configure the second node to transmit the periodic positioning reference signals.

Clause 19. The method of clause 18, wherein: the second set of parameters comprises a system frame number (SFN) offset or an SFN-plus-slot offset, the one or more first time instances comprise one or more system frames or one or more slots, and the SFN offset identifies the one or more system frames or the SFN-plus-slot offset identifies the one or more slots.

Clause 20. The method of any of clauses 18 to 19, wherein the second set of parameters indicating at least the one or more first time instances of the plurality of periodic time instances comprises at least a time-domain offset parameter.

Clause 21. The method of clause 20, wherein: the second network node is a user equipment (UE), the first network node is a serving base station of the UE, and the periodic positioning reference signals are periodic sounding reference signals (SRS).

Clause 22. The method of clause 20, wherein: the first network node is a UE, the second network node is a base station or a sidelink UE with which the UE has an active communication connection, and the periodic positioning reference signals are periodic New Radio (NR) or Long-Term Evolution (LTE) positioning reference signals (PRS) or sidelink PRS (SL-PRS).

Clause 23. The method of any of clauses 18 to 21, wherein: the second network node is a UE, the first network node is a serving base station of the UE, the second set of parameters specify a transmission window that includes the one or more first time instances, and the serving base station is expected to configure the UE to transmit the periodic positioning reference signals at least during the one or more first time instances based on the transmission window.

Clause 24. The method of clause 23, wherein the second set of parameters comprise a start of the transmission window and an end of the transmission window.

Clause 25. The method of any of clauses 23 to 24, wherein the second set of parameters comprise a start of the transmission window and a length of the transmission window.

Clause 26. The method of any of clauses 23 to 25, wherein the first request is a Requested SRS Transmission Characteristics information element (IE) of a POSITIONING INFORMATION REQUEST message of a positioning information exchange procedure between the location server and the serving base station.

Clause 27. The method of any of clauses 18 to 26, further comprising: calculating an estimate of a location of the second network node.

Clause 28. A method of communication performed by a base station, comprising: receiving a request from a location server, the request including at least a set of parameters indicating one or more time instances during which a user equipment (UE) is expected to transmit periodic sounding reference signals (SRS); configuring the UE to transmit the periodic SRS at least during the one or more time instances; and determining whether to transmit, to the UE, a timing adjust (TA) update related to the periodic SRS within the one or more time instances, whether to avoid scheduling higher priority traffic during the one or more time instances, whether to request the UE to feedback to the base station any autonomous timing adjustments associated with the one or more time instances, or any combination thereof Clause 29. The method of clause 28, wherein the higher priority traffic includes aperiodic SRS, semi-persistent SRS, or both.

Clause 30. The method of any of clauses 28 to 29, wherein the autonomous timing adjustments comprise an autonomous TA update or other transmission timing adjustment.

Clause 31. The method of any of clauses 28 to 30, further comprising: transmitting the TA update to the UE.

Clause 32. The method of any of clauses 28 to 31, further comprising: refraining from scheduling higher priority traffic during the one or more time instances.

Clause 33. The method of any of clauses 28 to 32, further comprising: transmitting a request to the UE to feedback to the base station any autonomous timing adjustments associated with the one or more time instances.

Clause 34. The method of clause 33, further comprising: transmitting a timing window to the UE, the timing window indicating a time period during which the UE is expected to report autonomous timing adjustments.

Clause 35. A method of wireless communication performed by a user equipment (UE), comprising: receiving a request from a location server, the request including a configuration for the UE to report any timing adjustments associated with one or more time instances during which the UE is configured to transmit periodic sounding reference signals (SRS); performing a timing adjustment of the periodic SRS during at least one of the one or more time instances; and transmitting an indication of the timing adjustment to the location server.

Clause 36. A location server, comprising: a memory; at least one transceiver; and at least one processor communicatively coupled to the memory and the at least one transceiver, the at least one processor configured to: transmit, via the at least one transceiver, to a first network node, a first set of parameters indicating time and frequency information related to transmission of periodic positioning reference signals by a second network node; transmit, via the at least one transceiver, a first request to at least the first network node, the first request including at least a second set of parameters indicating one or more first time instances of a plurality of periodic time instances during which the first network node is expected to perform and report one or more first positioning measurements; and receive, via the at least one transceiver, a first measurement report from the first network node, the first measurement report including the one or more first positioning measurements of the periodic positioning reference signals transmitted by the second network node during the one or more first time instances.

Clause 37. The location server of clause 36, wherein: the second set of parameters comprises a system frame number (SFN) offset or an SFN-plus-slot offset, the one or more first time instances comprise one or more system frames or one or more slots, and the SFN offset identifies the one or more system frames or the SFN-plus-slot offset identifies the one or more slots.

Clause 38. The location server of any of clauses 36 to 37, wherein the second set of parameters comprises a measurement periodicity parameter and an offset parameter.

Clause 39. The location server of any of clauses 36 to 38, wherein: the second network node is a user equipment (UE), the first network node is a base station or a sidelink UE, and the periodic positioning reference signals are periodic sounding reference signals (SRS) or sidelink positioning reference signals (SL-PRS).

Clause 40. The location server of clause 39, wherein the UE does not have an active communication connection to the base station or the sidelink UE.

Clause 41. The location server of any of clauses 36 to 38, wherein: the first network node is a UE, the second network node is a base station or a sidelink UE, and the periodic positioning reference signals are periodic New Radio (NR) or Long-Term Evolution (LTE) positioning reference signals (PRS) or SL-PRS.

Clause 42. The location server of clause 41, wherein the UE has an active communication connection with the base station or the sidelink UE.

Clause 43. The location server of any of clauses 36 to 42, wherein: the second network node is a UE, the first network node is a neighboring base station of the UE or a sidelink UE with which the UE does not have an active communication connection, and the second set of parameters specify a measurement window that includes at least the one or more first time instances.

Clause 44. The location server of clause 43, wherein the second set of parameters comprise a start of the measurement window and an end of the measurement window.

Clause 45. The location server of any of clauses 43 to 44, wherein the second set of parameters comprise a start of the measurement window and a length of the measurement window.

Clause 46. The location server of any of clauses 41 to 45, wherein the first request is a MEASUREMENT REQUEST message of a measurement procedure between the location server and the base station.

Clause 47. The location server of any of clauses 36 to 46, wherein the one or more first positioning measurements comprise one or more time of arrival (ToA) measurements, one or more reference signal time difference (RSTD) measurements, one or more reception-to-transmission (Rx-Tx) time difference measurements, reference signal received power (RSRP) measurements, received signal strength indicator (RSSI) measurements, angle-based measurements, or any combination thereof Clause 48. The location server of any of clauses 36 to 47, wherein the at least one processor is further configured to: transmit, via the at least one transceiver, to a third network node, the first set of parameters indicating time and frequency information related to transmission of the periodic positioning reference signals by the second network node; transmit, via the at least one transceiver, a second request to the third network node, the second request including at least a third set of parameters indicating one or more second time instances of the plurality of periodic time instances during which the third network node is expected to perform and report one or more second positioning measurements; and receive, via the at least one transceiver, a second measurement report from the third network node, the second measurement report including the one or more second positioning measurements.

Clause 49. The location server of clause 48, wherein: the second network node is a UE, the first network node is a first base station involved in a positioning session with the UE, and the third network node is a second base station involved in the positioning session with the UE.

Clause 50. The location server of clause 48, wherein: the second network node is a base station, the first network node is a first UE involved in a positioning session with the base station, and the third network node is a second UE involved in a positioning session with the base station.

Clause 51. The location server of any of clauses 48 to 50, wherein: the one or more second time instances are different than the one or more first time instances.

Clause 52. The location server of any of clauses 36 to 51, wherein the at least one processor is further configured to: calculate an estimate of a location of the second network node.

Clause 53. A location server, comprising: a memory; at least one transceiver; and at least one processor communicatively coupled to the memory and the at least one transceiver, the at least one processor configured to: transmit, via the at least one transceiver, to a first network node, a first set of parameters indicating a time-domain periodicity and frequency allocation for transmission of periodic positioning reference signals by a second network node; and transmit, via the at least one transceiver, a first request to the first network node, the first request including at least a second set of parameters indicating at least one or more first time instances of a plurality of periodic time instances during which the first network node is requested to configure the second node to transmit the periodic positioning reference signals.

Clause 54. The location server of clause 53, wherein: the second set of parameters comprises a system frame number (SFN) offset or an SFN-plus-slot offset, the one or more first time instances comprise one or more system frames or one or more slots, and the SFN offset identifies the one or more system frames or the SFN-plus-slot offset identifies the one or more slots.

Clause 55. The location server of any of clauses 53 to 54, wherein the second set of parameters indicating at least the one or more first time instances of the plurality of periodic time instances comprises at least a time-domain offset parameter.

Clause 56. The location server of clause 55, wherein: the second network node is a user equipment (UE), the first network node is a serving base station of the UE, and the periodic positioning reference signals are periodic sounding reference signals (SRS).

Clause 57. The location server of clause 55, wherein: the first network node is a UE, the second network node is a base station or a sidelink UE with which the UE has an active communication connection, and the periodic positioning reference signals are periodic New Radio (NR) or Long-Term Evolution (LTE) positioning reference signals (PRS) or sidelink PRS (SL-PRS).

Clause 58. The location server of any of clauses 53 to 56, wherein: the second network node is a UE, the first network node is a serving base station of the UE, the second set of parameters specify a transmission window that includes the one or more first time instances, and the serving base station is expected to configure the UE to transmit the periodic positioning reference signals at least during the one or more first time instances based on the transmission window.

Clause 59. The location server of clause 58, wherein the second set of parameters comprise a start of the transmission window and an end of the transmission window.

Clause 60. The location server of any of clauses 58 to 59, wherein the second set of parameters comprise a start of the transmission window and a length of the transmission window.

Clause 61. The location server of any of clauses 58 to 60, wherein the first request is a Requested SRS Transmission Characteristics information element (IE) of a POSITIONING INFORMATION REQUEST message of a positioning information exchange procedure between the location server and the serving base station.

Clause 62. The location server of any of clauses 53 to 61, wherein the at least one processor is further configured to: calculate an estimate of a location of the second network node.

Clause 63. A base station, comprising: a memory; at least one transceiver; and at least one processor communicatively coupled to the memory and the at least one transceiver, the at least one processor configured to: receive, via the at least one transceiver, a request from a location server, the request including at least a set of parameters indicating one or more time instances during which a user equipment (UE) is expected to transmit periodic sounding reference signals (SRS); configure the UE to transmit the periodic SRS at least during the one or more time instances; and determine whether to transmit, to the UE, a timing adjust (TA) update related to the periodic SRS within the one or more time instances, whether to avoid scheduling higher priority traffic during the one or more time instances, whether to request the UE to feedback to the base station any autonomous timing adjustments associated with the one or more time instances, or any combination thereof.

Clause 64. The base station of clause 63, wherein the higher priority traffic includes aperiodic SRS, semi-persistent SRS, or both.

Clause 65. The base station of any of clauses 63 to 64, wherein the autonomous timing adjustments comprise an autonomous TA update or other transmission timing adjustment.

Clause 66. The base station of any of clauses 63 to 65, wherein the at least one processor is further configured to: transmit, via the at least one transceiver, the TA update to the UE.

Clause 67. The base station of any of clauses 63 to 66, wherein the at least one processor is further configured to: refrain from scheduling higher priority traffic during the one or more time instances.

Clause 68. The base station of any of clauses 63 to 67, wherein the at least one processor is further configured to: transmit, via the at least one transceiver, a request to the UE to feedback to the base station any autonomous timing adjustments associated with the one or more time instances.

Clause 69. The base station of clause 68, wherein the at least one processor is further configured to: transmit, via the at least one transceiver, a timing window to the UE, the timing window indicating a time period during which the UE is expected to report autonomous timing adjustments.

Clause 70. A user equipment (UE), comprising: a memory; at least one transceiver; and at least one processor communicatively coupled to the memory and the at least one transceiver, the at least one processor configured to: receive, via the at least one transceiver, a request from a location server, the request including a configuration for the UE to report any timing adjustments associated with one or more time instances during which the UE is configured to transmit periodic sounding reference signals (SRS); perform a timing adjustment of the periodic SRS during at least one of the one or more time instances; and transmit, via the at least one transceiver, an indication of the timing adjustment to the location server.

Clause 71. A location server, comprising: means for transmitting, to a first network node, a first set of parameters indicating time and frequency information related to transmission of periodic positioning reference signals by a second network node; means for transmitting a first request to at least the first network node, the first request including at least a second set of parameters indicating one or more first time instances of a plurality of periodic time instances during which the first network node is expected to perform and report one or more first positioning measurements; and means for receiving a first measurement report from the first network node, the first measurement report including the one or more first positioning measurements of the periodic positioning reference signals transmitted by the second network node during the one or more first time instances.

Clause 72. The location server of clause 71, wherein: the second set of parameters comprises a system frame number (SFN) offset or an SFN-plus-slot offset, the one or more first time instances comprise one or more system frames or one or more slots, and the SFN offset identifies the one or more system frames or the SFN-plus-slot offset identifies the one or more slots.

Clause 73. The location server of any of clauses 71 to 72, wherein the second set of parameters comprises a measurement periodicity parameter and an offset parameter.

Clause 74. The location server of any of clauses 71 to 73, wherein: the second network node is a user equipment (UE), the first network node is a base station or a sidelink UE, and the periodic positioning reference signals are periodic sounding reference signals (SRS) or sidelink positioning reference signals (SL-PRS).

Clause 75. The location server of clause 74, wherein the UE does not have an active communication connection to the base station or the sidelink UE.

Clause 76. The location server of any of clauses 71 to 73, wherein: the first network node is a UE, the second network node is a base station or a sidelink UE, and the periodic positioning reference signals are periodic New Radio (NR) or Long-Term Evolution (LTE) positioning reference signals (PRS) or SL-PRS.

Clause 77. The location server of clause 76, wherein the UE has an active communication connection with the base station or the sidelink UE.

Clause 78. The location server of any of clauses 71 to 77, wherein: the second network node is a UE, the first network node is a neighboring base station of the UE or a sidelink UE with which the UE does not have an active communication connection, and the second set of parameters specify a measurement window that includes at least the one or more first time instances.

Clause 79. The location server of clause 78, wherein the second set of parameters comprise a start of the measurement window and an end of the measurement window.

Clause 80. The location server of any of clauses 78 to 79, wherein the second set of parameters comprise a start of the measurement window and a length of the measurement window.

Clause 81. The location server of any of clauses 76 to 80, wherein the first request is a MEASUREMENT REQUEST message of a measurement procedure between the location server and the base station.

Clause 82. The location server of any of clauses 71 to 81, wherein the one or more first positioning measurements comprise one or more time of arrival (ToA) measurements, one or more reference signal time difference (RSTD) measurements, one or more reception-to-transmission (Rx-Tx) time difference measurements, reference signal received power (RSRP) measurements, received signal strength indicator (RSSI) measurements, angle-based measurements, or any combination thereof Clause 83. The location server of any of clauses 71 to 82, further comprising: means for transmitting, to a third network node, the first set of parameters indicating time and frequency information related to transmission of the periodic positioning reference signals by the second network node; means for transmitting a second request to the third network node, the second request including at least a third set of parameters indicating one or more second time instances of the plurality of periodic time instances during which the third network node is expected to perform and report one or more second positioning measurements; and means for receiving a second measurement report from the third network node, the second measurement report including the one or more second positioning measurements.

Clause 84. The location server of clause 83, wherein: the second network node is a UE, the first network node is a first base station involved in a positioning session with the UE, and the third network node is a second base station involved in the positioning session with the UE.

Clause 85. The location server of clause 83, wherein: the second network node is a base station, the first network node is a first UE involved in a positioning session with the base station, and the third network node is a second UE involved in a positioning session with the base station.

Clause 86. The location server of any of clauses 83 to 85, wherein: the one or more second time instances are different than the one or more first time instances.

Clause 87. The location server of any of clauses 71 to 86, further comprising: means for calculating an estimate of a location of the second network node.

Clause 88. A location server, comprising: means for transmitting, to a first network node, a first set of parameters indicating a time-domain periodicity and frequency allocation for transmission of periodic positioning reference signals by a second network node; and means for transmitting a first request to the first network node, the first request including at least a second set of parameters indicating at least one or more first time instances of a plurality of periodic time instances during which the first network node is requested to configure the second node to transmit the periodic positioning reference signals.

Clause 89. The location server of clause 88, wherein: the second set of parameters comprises a system frame number (SFN) offset or an SFN-plus-slot offset, the one or more first time instances comprise one or more system frames or one or more slots, and the SFN offset identifies the one or more system frames or the SFN-plus-slot offset identifies the one or more slots.

Clause 90. The location server of any of clauses 88 to 89, wherein the second set of parameters indicating at least the one or more first time instances of the plurality of periodic time instances comprises at least a time-domain offset parameter.

Clause 91. The location server of clause 90, wherein: the second network node is a user equipment (UE), the first network node is a serving base station of the UE, and the periodic positioning reference signals are periodic sounding reference signals (SRS).

Clause 92. The location server of clause 90, wherein: the first network node is a UE, the second network node is a base station or a sidelink UE with which the UE has an active communication connection, and the periodic positioning reference signals are periodic New Radio (NR) or Long-Term Evolution (LTE) positioning reference signals (PRS) or sidelink PRS (SL-PRS).

Clause 93. The location server of any of clauses 88 to 91, wherein: the second network node is a UE, the first network node is a serving base station of the UE, the second set of parameters specify a transmission window that includes the one or more first time instances, and the serving base station is expected to configure the UE to transmit the periodic positioning reference signals at least during the one or more first time instances based on the transmission window.

Clause 94. The location server of clause 93, wherein the second set of parameters comprise a start of the transmission window and an end of the transmission window.

Clause 95. The location server of any of clauses 93 to 94, wherein the second set of parameters comprise a start of the transmission window and a length of the transmission window.

Clause 96. The location server of any of clauses 93 to 95, wherein the first request is a Requested SRS Transmission Characteristics information element (IE) of a POSITIONING INFORMATION REQUEST message of a positioning information exchange procedure between the location server and the serving base station.

Clause 97. The location server of any of clauses 88 to 96, further comprising: means for calculating an estimate of a location of the second network node.

Clause 98. A base station, comprising: means for receiving a request from a location server, the request including at least a set of parameters indicating one or more time instances during which a user equipment (UE) is expected to transmit periodic sounding reference signals (SRS); means for configuring the UE to transmit the periodic SRS at least during the one or more time instances; and means for determining whether to transmit, to the UE, a timing adjust (TA) update related to the periodic SRS within the one or more time instances, whether to avoid scheduling higher priority traffic during the one or more time instances, whether to request the UE to feedback to the base station any autonomous timing adjustments associated with the one or more time instances, or any combination thereof Clause 99. The base station of clause 98, wherein the higher priority traffic includes aperiodic SRS, semi-persistent SRS, or both.

Clause 100. The base station of any of clauses 98 to 99, wherein the autonomous timing adjustments comprise an autonomous TA update or other transmission timing adjustment.

Clause 101. The base station of any of clauses 98 to 100, further comprising: means for transmitting the TA update to the UE.

Clause 102. The base station of any of clauses 98 to 101, further comprising: means for refraining from scheduling higher priority traffic during the one or more time instances.

Clause 103. The base station of any of clauses 98 to 102, further comprising: means for transmitting a request to the UE to feedback to the base station any autonomous timing adjustments associated with the one or more time instances.

Clause 104. The base station of clause 103, further comprising: means for transmitting a timing window to the UE, the timing window indicating a time period during which the UE is expected to report autonomous timing adjustments.

Clause 105. A user equipment (UE), comprising: means for receiving a request from a location server, the request including a configuration for the UE to report any timing adjustments associated with one or more time instances during which the UE is configured to transmit periodic sounding reference signals (SRS); means for performing a timing adjustment of the periodic SRS during at least one of the one or more time instances; and means for transmitting an indication of the timing adjustment to the location server.

Clause 106. A non-transitory computer-readable medium storing computer-executable instructions that, when executed by a location server, cause the location server to: transmit, to a first network node, a first set of parameters indicating time and frequency information related to transmission of periodic positioning reference signals by a second network node; transmit a first request to at least the first network node, the first request including at least a second set of parameters indicating one or more first time instances of a plurality of periodic time instances during which the first network node is expected to perform and report one or more first positioning measurements; and receive a first measurement report from the first network node, the first measurement report including the one or more first positioning measurements of the periodic positioning reference signals transmitted by the second network node during the one or more first time instances.

Clause 107. The non-transitory computer-readable medium of clause 106, wherein: the second set of parameters comprises a system frame number (SFN) offset or an SFN-plus-slot offset, the one or more first time instances comprise one or more system frames or one or more slots, and the SFN offset identifies the one or more system frames or the SFN-plus-slot offset identifies the one or more slots.

Clause 108. The non-transitory computer-readable medium of any of clauses 106 to 107, wherein the second set of parameters comprises a measurement periodicity parameter and an offset parameter.

Clause 109. The non-transitory computer-readable medium of any of clauses 106 to 108, wherein: the second network node is a user equipment (UE), the first network node is a base station or a sidelink UE, and the periodic positioning reference signals are periodic sounding reference signals (SRS) or sidelink positioning reference signals (SL-PRS).

Clause 110. The non-transitory computer-readable medium of clause 109, wherein the UE does not have an active communication connection to the base station or the sidelink UE.

Clause 111. The non-transitory computer-readable medium of any of clauses 106 to 108, wherein: the first network node is a UE, the second network node is a base station or a sidelink UE, and the periodic positioning reference signals are periodic New Radio (NR) or Long-Term Evolution (LTE) positioning reference signals (PRS) or SL-PRS.

Clause 112. The non-transitory computer-readable medium of clause 111, wherein the UE has an active communication connection with the base station or the sidelink UE.

Clause 113. The non-transitory computer-readable medium of any of clauses 106 to 112, wherein: the second network node is a UE, the first network node is a neighboring base station of the UE or a sidelink UE with which the UE does not have an active communication connection, and the second set of parameters specify a measurement window that includes at least the one or more first time instances.

Clause 114. The non-transitory computer-readable medium of clause 113, wherein the second set of parameters comprise a start of the measurement window and an end of the measurement window.

Clause 115. The non-transitory computer-readable medium of any of clauses 113 to 114, wherein the second set of parameters comprise a start of the measurement window and a length of the measurement window.

Clause 116. The non-transitory computer-readable medium of any of clauses 111 to 115, wherein the first request is a MEASUREMENT REQUEST message of a measurement procedure between the location server and the base station.

Clause 117. The non-transitory computer-readable medium of any of clauses 106 to 116, wherein the one or more first positioning measurements comprise one or more time of arrival (ToA) measurements, one or more reference signal time difference (RSTD) measurements, one or more reception-to-transmission (Rx-Tx) time difference measurements, reference signal received power (RSRP) measurements, received signal strength indicator (RSSI) measurements, angle-based measurements, or any combination thereof.

Clause 118. The non-transitory computer-readable medium of any of clauses 106 to 117, further comprising computer-executable instructions that, when executed by the location server, cause the location server to: transmit, to a third network node, the first set of parameters indicating time and frequency information related to transmission of the periodic positioning reference signals by the second network node; transmit a second request to the third network node, the second request including at least a third set of parameters indicating one or more second time instances of the plurality of periodic time instances during which the third network node is expected to perform and report one or more second positioning measurements; and receive a second measurement report from the third network node, the second measurement report including the one or more second positioning measurements.

Clause 119. The non-transitory computer-readable medium of clause 118, wherein: the second network node is a UE, the first network node is a first base station involved in a positioning session with the UE, and the third network node is a second base station involved in the positioning session with the UE.

Clause 120. The non-transitory computer-readable medium of clause 118, wherein: the second network node is a base station, the first network node is a first UE involved in a positioning session with the base station, and the third network node is a second UE involved in a positioning session with the base station.

Clause 121. The non-transitory computer-readable medium of any of clauses 118 to 120, wherein: the one or more second time instances are different than the one or more first time instances.

Clause 122. The non-transitory computer-readable medium of any of clauses 106 to 121, further comprising computer-executable instructions that, when executed by the location server, cause the location server to: calculate an estimate of a location of the second network node.

Clause 123. A non-transitory computer-readable medium storing computer-executable instructions that, when executed by a location server, cause the location server to: transmit, to a first network node, a first set of parameters indicating a time-domain periodicity and frequency allocation for transmission of periodic positioning reference signals by a second network node; and transmit a first request to the first network node, the first request including at least a second set of parameters indicating at least one or more first time instances of a plurality of periodic time instances during which the first network node is requested to configure the second node to transmit the periodic positioning reference signals.

Clause 124. The non-transitory computer-readable medium of clause 123, wherein: the second set of parameters comprises a system frame number (SFN) offset or an SFN-plus-slot offset, the one or more first time instances comprise one or more system frames or one or more slots, and the SFN offset identifies the one or more system frames or the SFN-plus-slot offset identifies the one or more slots.

Clause 125. The non-transitory computer-readable medium of any of clauses 123 to 124, wherein the second set of parameters indicating at least the one or more first time instances of the plurality of periodic time instances comprises at least a time-domain offset parameter.

Clause 126. The non-transitory computer-readable medium of clause 125, wherein: the second network node is a user equipment (UE), the first network node is a serving base station of the UE, and the periodic positioning reference signals are periodic sounding reference signals (SRS).

Clause 127. The non-transitory computer-readable medium of clause 125, wherein: the first network node is a UE, the second network node is a base station or a sidelink UE with which the UE has an active communication connection, and the periodic positioning reference signals are periodic New Radio (NR) or Long-Term Evolution (LTE) positioning reference signals (PRS) or sidelink PRS (SL-PRS).

Clause 128. The non-transitory computer-readable medium of any of clauses 123 to 126, wherein: the second network node is a UE, the first network node is a serving base station of the UE, the second set of parameters specify a transmission window that includes the one or more first time instances, and the serving base station is expected to configure the UE to transmit the periodic positioning reference signals at least during the one or more first time instances based on the transmission window.

Clause 129. The non-transitory computer-readable medium of clause 128, wherein the second set of parameters comprise a start of the transmission window and an end of the transmission window.

Clause 130. The non-transitory computer-readable medium of any of clauses 128 to 129, wherein the second set of parameters comprise a start of the transmission window and a length of the transmission window.

Clause 131. The non-transitory computer-readable medium of any of clauses 128 to 130, wherein the first request is a Requested SRS Transmission Characteristics information element (IE) of a POSITIONING INFORMATION REQUEST message of a positioning information exchange procedure between the location server and the serving base station.

Clause 132. The non-transitory computer-readable medium of any of clauses 123 to 131, further comprising computer-executable instructions that, when executed by the location server, cause the location server to: calculate an estimate of a location of the second network node.

Clause 133. A non-transitory computer-readable medium storing computer-executable instructions that, when executed by a base station, cause the base station to: receive a request from a location server, the request including at least a set of parameters indicating one or more time instances during which a user equipment (UE) is expected to transmit periodic sounding reference signals (SRS); configure the UE to transmit the periodic SRS at least during the one or more time instances; and determine whether to transmit, to the UE, a timing adjust (TA) update related to the periodic SRS within the one or more time instances, whether to avoid scheduling higher priority traffic during the one or more time instances, whether to request the UE to feedback to the base station any autonomous timing adjustments associated with the one or more time instances, or any combination thereof.

Clause 134. The non-transitory computer-readable medium of clause 133, wherein the higher priority traffic includes aperiodic SRS, semi-persistent SRS, or both.

Clause 135. The non-transitory computer-readable medium of any of clauses 133 to 134, wherein the autonomous timing adjustments comprise an autonomous TA update or other transmission timing adjustment.

Clause 136. The non-transitory computer-readable medium of any of clauses 133 to 135, further comprising computer-executable instructions that, when executed by the base station, cause the base station to: transmit the TA update to the UE.

Clause 137. The non-transitory computer-readable medium of any of clauses 133 to 136, further comprising computer-executable instructions that, when executed by the base station, cause the base station to: refrain from scheduling higher priority traffic during the one or more time instances.

Clause 138. The non-transitory computer-readable medium of any of clauses 133 to 137, further comprising computer-executable instructions that, when executed by the base station, cause the base station to: transmit a request to the UE to feedback to the base station any autonomous timing adjustments associated with the one or more time instances.

Clause 139. The non-transitory computer-readable medium of clause 138, further comprising computer-executable instructions that, when executed by the base station, cause the base station to: transmit a timing window to the UE, the timing window indicating a time period during which the UE is expected to report autonomous timing adjustments.

Clause 140. A non-transitory computer-readable medium storing computer-executable instructions that, when executed by a user equipment (UE), cause the UE to: receive a request from a location server, the request including a configuration for the UE to report any timing adjustments associated with one or more time instances during which the UE is configured to transmit periodic sounding reference signals (SRS); perform a timing adjustment of the periodic SRS during at least one of the one or more time instances; and transmit an indication of the timing adjustment to the location server.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of communication performed by a location server, comprising:

transmitting, to a first network node, a first set of parameters indicating time and frequency information related to transmission of periodic positioning reference signals by a second network node;

transmitting a first request to at least the first network node, the first request including at least a second set of parameters indicating one or more first time instances of a plurality of periodic time instances during which the first network node is expected to perform and report one or more first positioning measurements; and receiving a first measurement report from the first network node, the first measurement report including the one or more first positioning measurements of the periodic positioning reference signals transmitted by the second network node during the one or more first time instances, wherein the second set of parameters comprises a system frame number (SFN) offset or an SFN-plus-slot offset, the one or more first time instances comprise one or more system frames or one or more slots, and the SFN offset identifies the one or more system frames or the SFN-plus-slot offset identifies the one or more slots.

2. The method of claim 1, wherein the second set of parameters comprises a measurement periodicity parameter and an offset parameter.

3. The method of claim 1, wherein:

the second network node is a user equipment (UE), the first network node is a base station or a sidelink UE, and the periodic positioning reference signals are periodic sounding reference signals (SRS) or sidelink positioning reference signals (SL-PRS).

4. The method of claim 3, wherein the UE does not have an active communication connection to the base station or the sidelink UE.

5. The method of claim 1, wherein:

the first network node is a UE, the second network node is a base station or a sidelink UE, and the periodic positioning reference signals are periodic New Radio (NR) or Long-Term Evolution (LTE) positioning reference signals (PRS) or SL-PRS.

6. The method of claim 5, wherein the UE has an active communication connection with the base station or the sidelink UE.

7. The method of claim 5, wherein the first request is a MEASUREMENT REQUEST message of a measurement procedure between the location server and the base station.

8. The method of claim 1, wherein:

the second network node is a UE, the first network node is a neighboring base station of the UE or a sidelink UE with which the UE does not have an active communication connection, and the second set of parameters specify a measurement window that includes at least the one or more first time instances.

9. The method of claim 8, wherein the second set of parameters comprise a start of the measurement window and an end of the measurement window.

10. The method of claim 8, wherein the second set of parameters comprise a start of the measurement window and a length of the measurement window.

11. The method of claim 1, wherein the one or more first positioning measurements comprise one or more time of arrival (ToA) measurements, one or more reference signal time difference (RSTD) measurements, one or more reception-to-transmission (Rx-Tx) time difference measurements, reference signal received power (RSRP) measurements, received signal strength indicator (RSSI) measurements, angle-based measurements, or any combination thereof.

12. The method of claim 1, further comprising:

transmitting, to a third network node, the first set of parameters indicating time and frequency information related to transmission of the periodic positioning reference signals by the second network node;

transmitting a second request to the third network node, the second request including at least a third set of parameters indicating one or more second time instances of the plurality of periodic time instances during which the third network node is expected to perform and report one or more second positioning measurements; and receiving a second measurement report from the third network node, the second measurement report including the one or more second positioning measurements.

13. The method of claim 12, wherein:

the second network node is a UE, the first network node is a first base station involved in a positioning session with the UE, and the third network node is a second base station involved in the positioning session with the UE.

14. The method of claim 12, wherein:

the second network node is a base station, the first network node is a first UE involved in a positioning session with the base station, and the third network node is a second UE involved in a positioning session with the base station.

15. The method of claim 12, wherein:

the one or more second time instances are different than the one or more first time instances.

16. The method of claim 1, further comprising:

calculating an estimate of a location of the second network node.

17. A method of communication performed by a location server, comprising:

transmitting, to a first network node, a first set of parameters indicating a time-domain periodicity and frequency allocation for transmission of periodic positioning reference signals by a second network node; and transmitting a first request to the first network node, the first request including at least a second set of parameters indicating at least one or more first time instances of a plurality of periodic time instances during which the first network node is requested to configure the second node to transmit the periodic positioning reference signals, wherein the second set of parameters comprises a system frame number (SFN) offset or an SFN-plus-slot offset, the one or more first time instances comprise one or more system frames or one or more slots, and the SFN offset identifies the one or more system frames or the SFN-plus-slot offset identifies the one or more slots.

18. The method of claim 17, wherein the second set of parameters indicating at least the one or more first time instances of the plurality of periodic time instances comprises at least a time-domain offset parameter.

19. The method of claim 18, wherein:

the second network node is a user equipment (UE), the first network node is a serving base station of the UE, and the periodic positioning reference signals are periodic sounding reference signals (SRS).

20. The method of claim 18, wherein:

the first network node is a UE, the second network node is a base station or a sidelink UE with which the UE has an active communication connection, and the periodic positioning reference signals are periodic New Radio (NR) or Long-Term Evolution (LTE) positioning reference signals (PRS) or sidelink PRS (SL-PRS).

21. The method of claim 17, wherein:

the second network node is a UE, the first network node is a serving base station of the UE, the second set of parameters specify a transmission window that includes the one or more first time instances, and the serving base station is expected to configure the UE to transmit the periodic positioning reference signals at least during the one or more first time instances based on the transmission window.

22. The method of claim 17, further comprising:

calculating an estimate of a location of the second network node.

23. A method of communication performed by a base station, comprising:

receiving a request from a location server, the request including at least a set of parameters indicating one or more time instances during which a user equipment (UE) is expected to transmit periodic sounding reference signals (SRS), wherein the set of parameters includes a system frame number (SFN) offset or an SFN-plus-slot offset;

configuring the UE to transmit the periodic SRS at least during the one or more time instances, wherein the one or more time instances include one or more system frames or one or more slots, and the SFN offset identifies the one or more system frames or the SFN-plus-offset identifies the one or more slots; and determining whether to transmit, to the UE, a timing adjust (TA) update related to the periodic SRS within the one or more time instances, whether to avoid scheduling higher priority traffic during the one or more time instances, whether to request the UE to feedback to the base station any autonomous timing adjustments associated with the one or more time instances, or any combination thereof.

24. The method of claim 23, wherein the higher priority traffic includes aperiodic SRS, semi-persistent SRS, or both.

25. The method of claim 23, wherein the autonomous timing adjustments comprise an autonomous TA update or other transmission timing adjustment.

26. The method of claim 23, further comprising:

refraining from scheduling higher priority traffic during the one or more time instances.

27. The method of claim 23, further comprising:

transmitting a request to the UE to feedback to the base station any autonomous timing adjustments associated with the one or more time instances.

28. A method of wireless communication performed by a user equipment (UE), comprising:

receiving a request from a location server, the request including a configuration for the UE to report any timing adjustments associated with one or more time instances during which the UE is configured to transmit periodic sounding reference signals (SRS), wherein the configuration includes a set of parameters that include a system frame number (SFN) offset or an SFN-plus-slot offset;

performing a timing adjustment of the periodic SRS during at least one of the one or more time instances, wherein the one or more time instances include one or more system frames or one or more slots, and the SFN offset identifies the one or more system frames or the SFN-plus-offset identifies the one or more slots; and transmitting an indication of the timing adjustment to the location server.

\* \* \* \* \*